United States Patent
Tabet et al.

(10) Patent No.: US 11,039,417 B2
(45) Date of Patent: *Jun. 15, 2021

(54) ENHANCED PAGING SCHEMES AND CONNECTED-STATE DRX

(71) Applicant: Apple Inc., Cupertino, CA (US)

(72) Inventors: Tarik Tabet, Los Gatos, CA (US); Syed Aon Mujtaba, Palo Alto, CA (US); Moustafa M. Elsayed, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/665,069

(22) Filed: Oct. 28, 2019

(65) Prior Publication Data

US 2020/0059892 A1    Feb. 20, 2020

Related U.S. Application Data

(63) Continuation of application No. 16/288,996, filed on Feb. 28, 2019, now Pat. No. 10,462,765, which is a
(Continued)

(51) Int. Cl.
*H04W 68/00* (2009.01)
*H04W 72/04* (2009.01)
*H04W 76/28* (2018.01)

(52) U.S. Cl.
CPC ....... *H04W 68/005* (2013.01); *H04W 72/042* (2013.01); *H04W 72/048* (2013.01); *H04W 72/0446* (2013.01); *H04W 76/28* (2018.02)

(58) Field of Classification Search
None
See application file for complete search history.

(56) References Cited

U.S. PATENT DOCUMENTS

| 7,177,654 B2 | 2/2007 | Stenberg |
| 8,194,559 B2 | 6/2012 | Chun et al. |

(Continued)

FOREIGN PATENT DOCUMENTS

| CN | 104704884 A | 6/2015 |
| CN | 105191356 A | 12/2015 |

(Continued)

OTHER PUBLICATIONS

Invitation to Pay Additional Fees, International Application No. PCT/US2015/039923, dated Oct. 21, 2015, 7 pages.
(Continued)

*Primary Examiner* — Gregory B Sefcheck
*Assistant Examiner* — Amarnauth G Persaud
(74) *Attorney, Agent, or Firm* — Kowert, Hood, Munyon, Rankin & Goetzel, P.C.

(57) ABSTRACT

For paging user devices that are link budget limited (LBL), a base station transmits a special ID that is used by said devices to identify a paging frame and/or a paging occasion. When transmitting a paging message for an LBL device, the base station may use: (a) larger aggregation and larger CFI (than conventionally allowed) and (b) a larger number of resource blocks (than conventionally allowed) for paging payload. If paging messages for LBL devices saturate the paging frame capacity, the base station may allocate a plurality of special IDs. If paging messages for LBL devices and/or other data transfers saturate network capacity, at least a subset of the LBL devices may be directed to enter a connected-state discontinuous reception (DRX) mode, wherein those devices will remain in connected mode and periodically check for resource allocations. Paging payload information may be repeatedly transmitted in successive subframes, to support soft combining.

20 Claims, 24 Drawing Sheets

Related U.S. Application Data continuation of application No. 15/860,410, filed on Jan. 2, 2018, now Pat. No. 10,244,506, which is a continuation of application No. 14/795,733, filed on Jul. 9, 2015, now Pat. No. 9,883,480.

(60) Provisional application No. 62/023,796, filed on Jul. 11, 2014, provisional application No. 62/039,777, filed on Aug. 20, 2014.

(56) References Cited

U.S. PATENT DOCUMENTS

| | | | |
|---|---|---|---|
| 8,606,304 B2 | 12/2013 | Iwamura et al. | |
| 8,711,671 B2 | 4/2014 | Frederiksen et al. | |
| 10,091,764 B2 | 10/2018 | Hsu et al. | |
| 2013/0012206 A1* | 1/2013 | Kitazoe | H04W 68/00 455/435.1 |
| 2013/0083753 A1 | 4/2013 | Lee et al. | |
| 2013/0109391 A1* | 5/2013 | Lee | H04W 48/12 455/436 |
| 2013/0182626 A1* | 7/2013 | Kuo | H04W 52/0216 370/311 |
| 2013/0303203 A1* | 11/2013 | Wang | H04W 68/00 455/458 |
| 2014/0098761 A1 | 4/2014 | Lee et al. | |
| 2014/0120936 A1* | 5/2014 | Chen | H04W 48/06 455/452.1 |
| 2014/0146678 A1 | 5/2014 | Merlin et al. | |
| 2014/0161092 A1 | 6/2014 | Seo et al. | |
| 2014/0247788 A1* | 9/2014 | Kim | H04W 68/025 370/329 |
| 2015/0031382 A1 | 1/2015 | Damnjanovic et al. | |
| 2015/0245323 A1* | 8/2015 | You | H04W 72/042 370/329 |
| 2015/0282208 A1 | 10/2015 | Yi et al. | |
| 2016/0007316 A1* | 1/2016 | Vaidya | H04W 64/003 370/312 |
| 2016/0050626 A1 | 2/2016 | Chen | |
| 2016/0057738 A1 | 2/2016 | Lee et al. | |
| 2016/0135146 A1* | 5/2016 | Schier | H04W 72/121 370/312 |
| 2016/0198406 A1* | 7/2016 | Hoglund | H04W 48/08 370/311 |
| 2016/0234804 A1* | 8/2016 | Hu | H04W 68/02 |
| 2017/0055211 A1* | 2/2017 | Yu | H04W 68/02 |

FOREIGN PATENT DOCUMENTS

| | | |
|---|---|---|
| TW | 201408106 A | 2/2014 |
| WO | 2009063422 | 5/2009 |
| WO | 10333967 A | 10/2013 |
| WO | 2015026285 | 2/2015 |
| WO | 2015051547 A1 | 4/2015 |
| WO | 2015051614 | 4/2015 |
| WO | 2015184642 | 12/2015 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode", Jun. 2014, 36 pages, Release 12, 3rd Generation Partnership Project, Valbonne, France.

International Search Report and Written Opinion, Application No. PCT/US2015/039923, dated Jan. 20, 2016, 18 pages.

Office Action, ROC (Taiwan) Pat. Appln. No. 104122619, dated Apr. 18, 2017, 47 pages.

Communication pursuant to Article 94(3) EPC, European Application No. 15739484.2, dated Dec. 21, 2018, 6 pages.

Office Action, Chinese Application for Invention No. 201580037359.9, dated Jul. 2, 2019, seven pages.

Chines Office Action from Chinese Patent for Invention No. ZL201580037359.9, dated May 7, 2020, 12 pages.

LTE; Evolved Universal Terrestrial Radio Access (E-Utra); User Equipment (UE) procedures in idle mode (3GPP TS 36.304 version 12.2.0, release 12), ETSI TS 136 304 V1.2.2.0, Sep. 2014; 39 pages.

Office Action for Chinese Application for Invention No. 202010673986.4, dated Mar. 15, 2021, 6 pages.

3GPP TS 36.304 V12.1.0, 3GPP 3rd Generation Partnership Project; Technical Specification Group Radio Access Network; Evolved Universal Terrestrial Radio Access (E-UTRA);User Equipment (UE) procedures in idle mode (Release 12), Jun. 2014, 35 pages.

* cited by examiner sF# = subframe number
PO = paging occasion sF# = subframe number
PO = paging occasion
$R_{i\_s=n}$ = repetition for $P_{i\_s=n}$

| Ns = 2 | | | | | | | | | | |
|---|---|---|---|---|---|---|---|---|---|---|
| sF# | 0 | 1 | 2 | 3 | 4 | 5 | 6 | 7 | 8 | 9 |
| PO | | | | | $P_{i\_s=0}$ | $R_{i\_s=0}$ | $R_{i\_s=0}$ | $R_{i\_s=0}$ | $R_{i\_s=0}$ | $P_{i\_s=1}$ |

Paging Frame →

| sF# | 0 | 1 | 2 | 3 | 4 | 5 | 6 | 7 | 8 | 9 |
|---|---|---|---|---|---|---|---|---|---|---|
| PO | $R_{i\_s=1}$ | $R_{i\_s=1}$ | $R_{i\_s=1}$ | $R_{i\_s=1}$ | | | | | | |

Next Frame →

*FIG. 20b* sF# = subframe number
PO = paging occasion
$R_{i\_s=n}$ = repetition for $P_{i\_s=n}$

| Ns' = 2 | | | | | | | | | | |
|---|---|---|---|---|---|---|---|---|---|---|
| sF# | 0 | 1 | 2 | 3 | 4 | 5 | 6 | 7 | 8 | 9 |
| PO | | $P_{i\_s'=0}$ | $R_{i\_s'=0}$ | $R_{i\_s'=0}$ | | | $P_{i\_s'=1}$ | $R_{i\_s'=1}$ | $R_{i\_s'=1}$ | |

ENHANCED PAGING SCHEMES AND CONNECTED-STATE DRX

PRIORITY CLAIM INFORMATION

This application is a continuation of U.S. patent application Ser. No. 16/288,996, filed Feb. 28, 2019, titled "Enhanced Paging Schemes and Connected-State DRX", now U.S. Pat. No. 10,462,965, which is a continuation of U.S. patent application Ser. No. 15/860,410, filed Jan. 2, 2018, titled "Enhanced Paging Schemes and Connected-State DRX", which is a continuation of U.S. patent application Ser. No. 14/795,733, filed Jul. 9, 2015, titled "Enhanced Paging Schemes and Connected-State DRX", now U.S. Pat. No. 9,883,480, which claims benefit of priority to U.S. Provisional Application No. 62/023,796, filed Jul. 11, 2014, titled "Enhanced Paging Schemes for Power Saving and Range Improvement in LTE and Connected-State DRX", by Tarik Tabet, Syed Aon Mujtaba and Moustafa Elsayed; and U.S. Provisional Application No. 62/039,777, filed Aug. 20, 2014, titled "Enhanced Paging Schemes for Power Saving and Range Improvement in LTE and Connected-State DRX", by Tarik Tabet, Syed Aon Mujtaba and Moustafa Elsayed. All of the above-identified applications are hereby incorporated by reference in their entireties as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communication, and more particularly, to mechanisms for paging user equipment (UE) devices that are link budget limited and mechanisms for performing discontinuous reception during a connected mode of UE operation.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, etc.

In cellular radio access technologies (RATs) such as LTE, paging is a procedure used by the network (NW) to inform the user equipment (UE) of an incoming data/call. A paging message requests the UE to attach to the network, and establish a NAS signaling connection with the network. (NAS is an acronym for Non-Access Stratum; The Non-Access Stratum is a set of protocols in the Evolved Packet System, used to convey non-radio signalling between the UE and the Mobility Management Entity for an LTE/E-UTRAN access). A paging message can also be used to notify the UE of a System Information (SI) change or of ETWS information. (ETWS is an acronym for Earthquake and Tsunami Warning System).

The network uses the paging procedure mainly because the network does not know the location of the UE, e.g., when the UE is in idle mode. Thus, paging is the first procedure performed by the network to establish a connection with the UE. The use of paging to establish a connection from the network to the UE is similar to the RACH (Random Access Channel) procedure used by the UE to establish a connection with the network.

Detection of a paging message by the UE is extremely important, as the failure of a UE to detect a paging message can lead to missed calls or lost data. The UE is particularly vulnerable to missing a paging message if the UE is link budget limited. For example, a UE may be link budget limited if it is equipped with a poorly performing antenna system and/or if the UE is located in area of poor coverage (e.g., in the basement of a building, or far from the base station). Therefore, there exists a need for improved paging mechanisms for UE devices that are (or become) link budget limited.

SUMMARY

Embodiments are presented herein of, inter alia, improved paging methods which help to alleviate the effects of bad reception of the paging channel, and of devices configured to implement the methods.

For paging user equipment (UE) devices that are link budget limited, a base station may transmit a special ID (e.g., as part of SIB2) that is used by said UE devices to compute a paging frame identifier and/or a paging occasion identifier. The special ID may be dedicated for use by (and/or with) link budget limited devices. When transmitting a paging message for a link budget limited device, the base station may (a) use larger aggregation and a larger CFI (control frame indicator) value (than allowed in current wireless communication standards) for paging control information, and (b) use a larger number of resource blocks (than allowed in current wireless communication standards) for paging payload. The paging occasion identifier may be computed based on a dedicated value of parameter Ns and a dedicated set of paging occasion identifier values (different from conventionally-used paging occasion identifier values).

If paging messages for link budget limited devices start to saturate the capacity of the single paging frame determined by the special ID, the base station may allocate a plurality of special IDs, thus implying a plurality of available paging frames for such devices.

If paging messages for link budget limited devices and/or other data transfers start to saturate network capacity, at least a subset of the link budget limited devices may be directed to enter a connected-state discontinuous reception (DRX) mode, wherein those devices will periodically check for resource allocations while remaining in connected mode.

In some embodiments, paging payload information may be initially transmitted on a paging occasion, and immediately followed by repeated transmissions in the following subframes, to support soft combining at the user device.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document.

Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 20b illustrates a paging payload repetition scheme for the case Ns=2, according to some embodiments.

FIG. 21 illustrates an alternative scheme for paging payload repetition, based on a modified paging occasion table, according to some embodiments.

Figure 1:
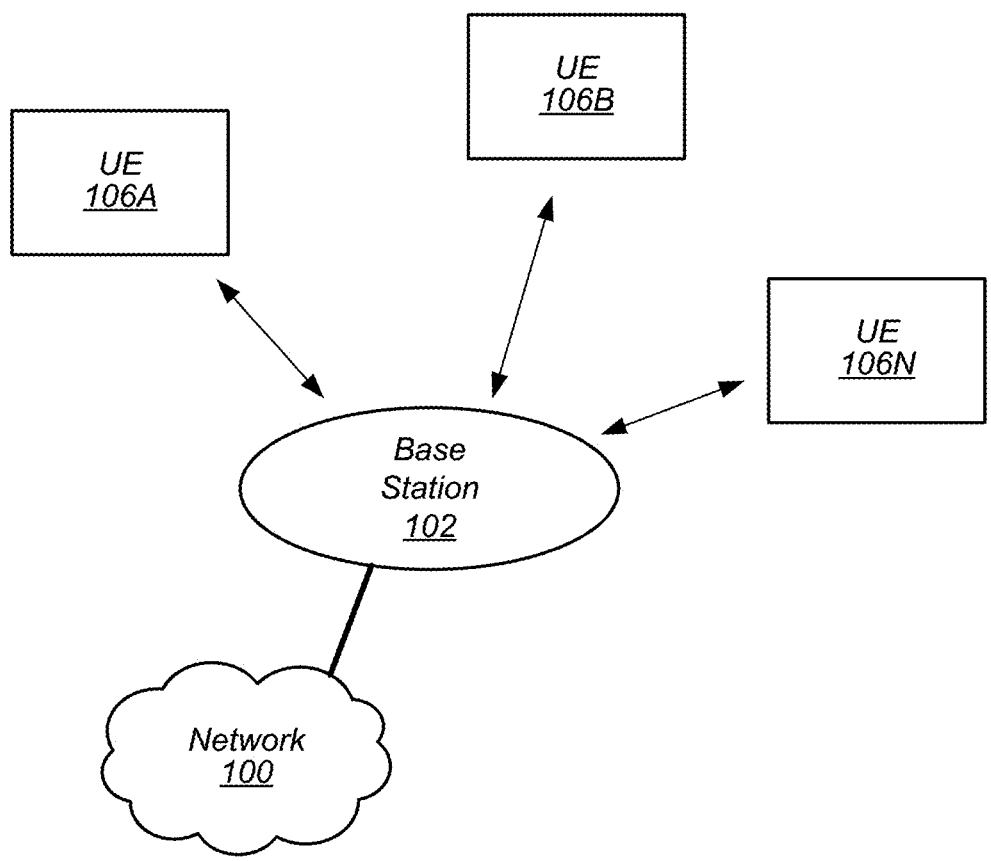
FIG. 1 illustrates an exemplary wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect.

Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which perform wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc)., without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc). is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates a wireless communication system, according to one set of embodiments. It is noted that FIG. 1 represents one possibility among many, and that features of the present disclosure may be implemented in any of various systems, as desired.

As shown, the exemplary wireless communication system includes a base station 102A which communicates over a transmission medium with one or more wireless devices 106A, 106B, etc., through 106N. Wireless devices may be user devices, which may be referred to herein as "user equipment" (UE) or UE devices.

The base station 102 may be a base transceiver station (BTS) or cell site, and may include hardware that enables wireless communication with the UE devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and/or between the UE devices 106 and the network 100.

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX, etc.

Base station 102 and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Thus, while base station 102 may presently represent a "serving cell" for wireless devices 106A-N as illustrated in FIG. 1, each UE device 106 may also be capable of receiving signals from one or more other cells (e.g., cells provided by other base stations), which may be referred to as "neighboring cells". Such cells may also be capable of facilitating communication between user devices and/or between user devices and the network 100.

Note that at least in some instances a UE device 106 may be capable of communicating using multiple wireless communication technologies. For example, a UE device 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication technologies (including more than two wireless communication technologies) are also possible. Likewise, in some instances a UE device 106 may be configured to communicate using only a single wireless communication technology.

Figure 2:
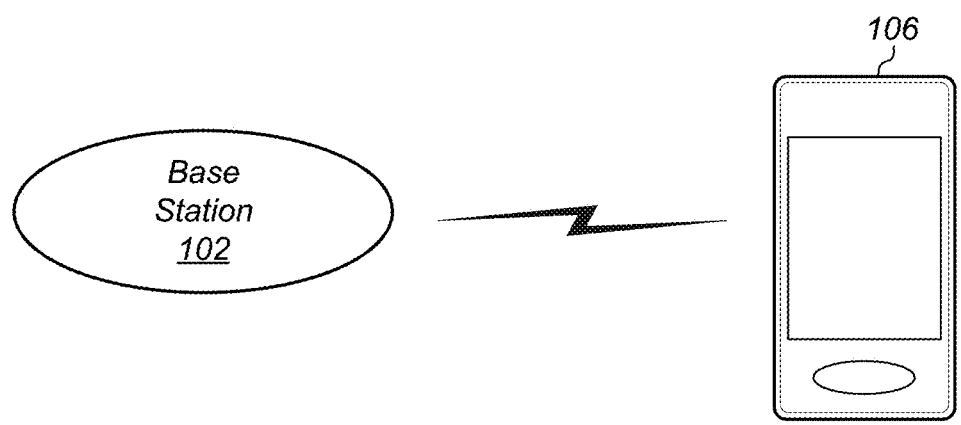
FIG. 2 illustrates a base station ("BS", or in the context of LTE, an "eNodeB" or "eNB") in communication with a wireless device, according to some embodiments.

FIG. 2 illustrates an example of UE device 106 (e.g., one of the devices 106A through 106N) in communication with base station 102, according to one set of embodiments. The UE device 106 may have cellular communication capability, and as described above, may be a device such as a mobile phone, a hand-held device, a media player, a computer, a laptop or a tablet, or virtually any type of wireless device.

The UE device 106 may include a processor that is configured to execute program instructions stored in memory. The UE device 106 may perform any of the method embodiments described herein by executing such stored instructions. Alternatively, or in addition, the UE device 106 may include a programmable hardware element such as an FPGA (field-programmable gate array) that is configured to perform any of the method embodiments described herein, or any portion of any of the method embodiments described herein.

In some embodiments, the UE device 106 may be configured to communicate using any of multiple radio access technologies and/or wireless communication protocols. For example, the UE device 106 may be configured to communicate using one or more of GSM, UMTS, CDMA2000, LTE, LTE-A, WLAN, Wi-Fi, WiMAX or GNSS. Other combinations of wireless communication technologies are also possible.

The UE device 106 may include one or more antennas for communicating using one or more wireless communication protocols or technologies. In one embodiment, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE or 1×RTT (or LTE or GSM), and separate radios for communicating using each of Wi-Fi and Bluetooth. Other configurations are also possible.

Figure 3:
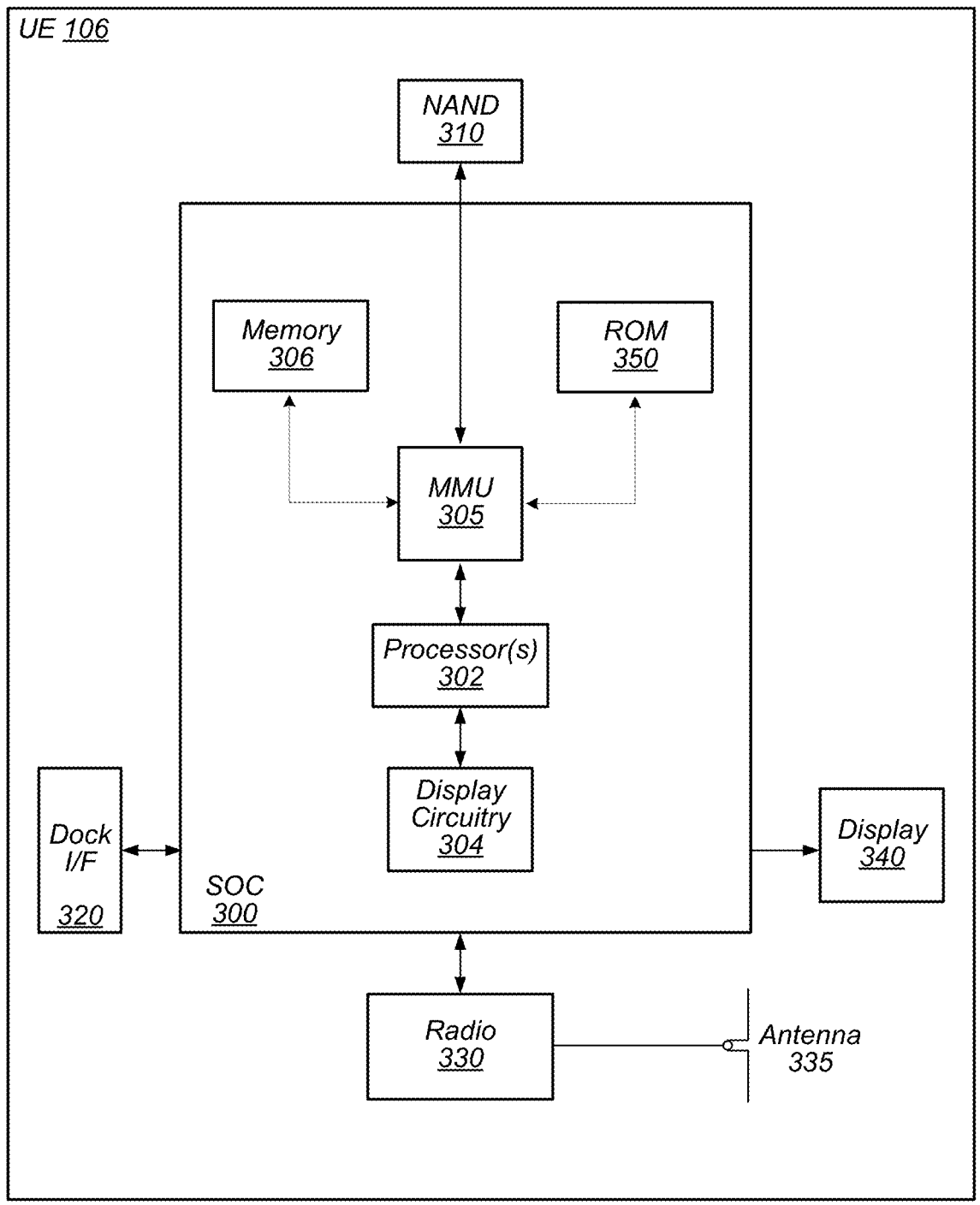
FIG. 3 illustrates a block diagram for an exemplary wireless communication system, according to some embodiments.

FIG. 3—Example Block Diagram of a UE

FIG. 3 illustrates a block diagram of a UE 106, according to one set of embodiments. As shown, the UE 106 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310). The MMU 340 may be configured to perform memory protection and page table translation or set up. In some embodiments, the MMU 340 may be included as a portion of the processor(s) 302.

The UE 106 may also include other circuits or devices, such as the display circuitry 304, radio 330, connector I/F 320, and/or display 340.

In the embodiment shown, ROM 350 may include a boot loader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to a computer system), the display 340, and wireless communication circuitry (e.g., for communication using LTE, CDMA2000, Bluetooth, Wi-Fi, GPS, etc).

The UE device 106 may include at least one antenna, and in some embodiments multiple antennas, for performing wireless communication with base stations and/or other devices. For example, the UE device 106 may use antenna 335 to perform the wireless communication. As noted above, the UE may in some embodiments be configured to communicate wirelessly using a plurality of wireless communication standards.

As described herein, the UE 106 may include hardware and software components for implementing a method for responding to enhanced paging according to embodiments of this disclosure.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
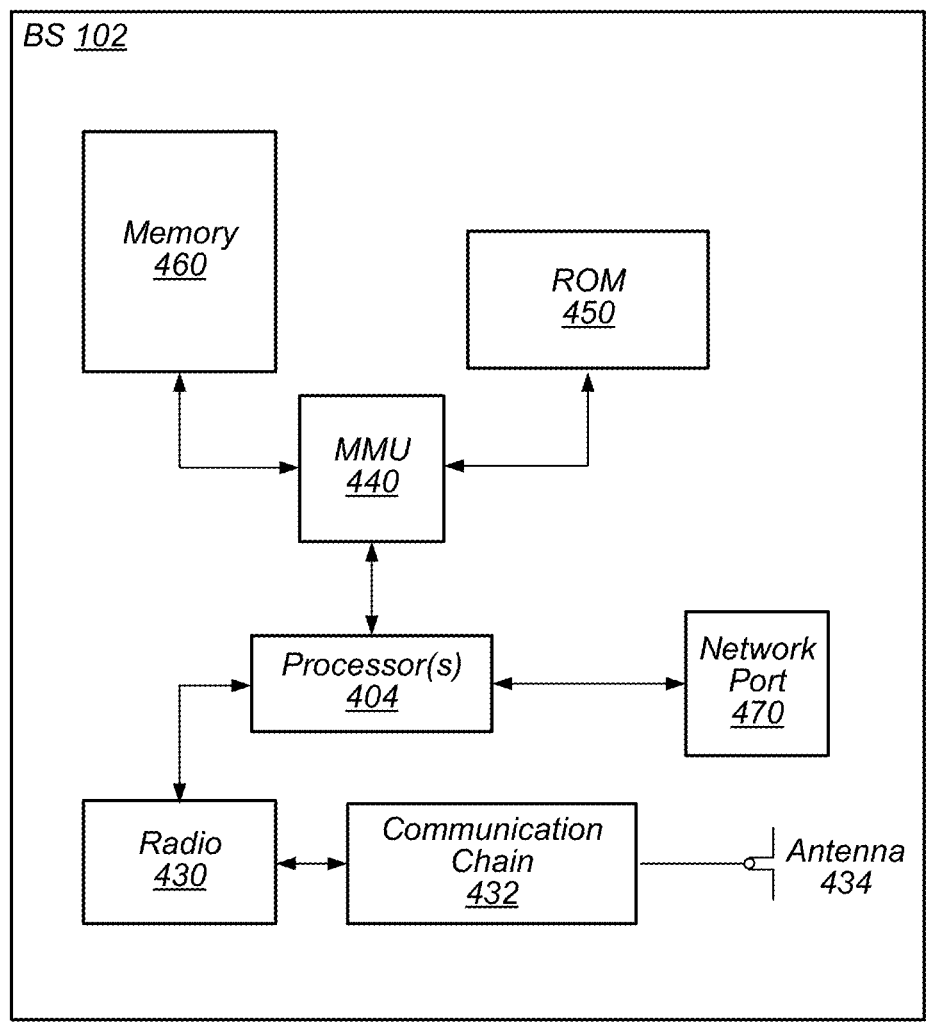
FIG. 4 illustrates a block diagram for an exemplary base station, according to some embodiments.

FIG. 4—Base Station

FIG. 4 illustrates an example of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430, a communication chain 432 and at least one antenna 434. The base station may be configured to operate as a wireless transceiver and may be further configured to communicate with UE devices 106 via radio 430, communication chain 432 and the at least one antenna 434. Communication chain 432 may be a receive chain, a transmit chain or both. The radio 430 may be configured to communicate via various RATs, including, but not limited to, GSM, UMTS, LTE, WCDMA, CDMA2000, WiMAX, etc.

The processor(s) 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

In some embodiments, the base station is configured to support OFDMA downlink communication and SC-FDMA uplink communication with UE devices. (OFDMA is an acronym for Orthogonal Frequency-Division Multiple Access. SC-FDMA is an acronym for Single Carrier—Frequency Division Multiple Access).

Paging in LTE

LTE uses various channels so that data can be transported across the LTE radio interface. These channels are used to segregate the different types of data and allow them to be transported across the radio access network in an orderly fashion. The different channels effectively provide interfaces to the higher layers within the LIE protocol structure, and enable an orderly and defined segregation of the data.

There are three categories or types of LIE data channels as follows.

Physical channels: These are transmission channels that carry user data and control messages.

Transport channels: The physical layer transport channels offer information transfer to Medium Access Control (MAC) and higher layers.

Logical channels: Provide services for the Medium Access Control (MAC) layer within the LTE protocol structure.

LTE defines a number of physical downlink channels to carry information received from the MAC and higher layers. The LTE downlink comprises a Physical Downlink Shared Channel (PDSCH) and a Physical Downlink Control Channel (PDCCH). The PDSCH is the channel that carries all user data and all signaling messages. The PDSCH is the main data bearing channel which is allocated to users on a dynamic and opportunistic basis. The PDCCH carries the layer one control for the shared channel. Thus, the PDSCH is the key channel for communicating information to the UE, and the PDCCH communicates metadata for the information, e.g., "who" the data is for, "what" data is sent, and "how" the data is sent over the air in the PDSCH.

As mentioned above, paging is a procedure performed by the network to inform the UE of incoming data or an incoming call (mobile terminated call). Put more simply, paging is the mechanism used by the network to inform the UE that it has information (e.g., data or a voice call) for the UE. In most instances the UE is in idle mode when the paging process occurs. In the idle mode, the UE performs discontinuous reception (DRX). In other words, the UE is in a sleep mode during part of the DRX cycle, and wakes up during another part of the DRX cycle to check if a paging message is being sent to the UE. Thus, the UE is required to spend energy (from its battery) while in idle mode to periodically monitor the network for paging messages. The UE receives and decodes the content of the paging message, and then the UE initiates the appropriate procedure. For example, the page issued by the network to the UE may cause the UE to attach to the network and establish a NAS signaling connection.

The Physical Downlink Shared Channel (PDSCH) is used to transmit paging payload information to the UE. The payload information may include the International Mobile Subscriber Identity (IMSI) of the UE being targeted by the page and a PS/CS indicator bit that indicates whether the page is for packet switched transfer or circuit switched transfer. (In embodiments where the UE supports only LTE, the PS/CS indicator bit may be omitted from the payload information). Furthermore, when a plurality of UEs are being paged, the payload information may include a plurality of IMSIs and a plurality of corresponding PS/CS indicators bits.

The Physical Downlink Control Channel (PDCCH) is used to transmit paging control information to the UE. The paging control information may include resource allocation information that specifies the location of the paging payload information in the PDSCH. During idle mode, the UE periodically wakes up and monitors the PDCCH in order to detect the presence of a paging message.

The base station may use a P-RNTI to scramble at least a portion (e.g., the CRC) of the paging control information. (P-RNTI is an acronym for "Paging—Radio Network Temporary Identifier"). The base station transmits the paging control information, including the scrambled portion, in the PDCCH. The P-RNTI is a temporary identity used for paging, and is not unique to any particular UE.

When the UE detects the presence of the P-RNTI scrambled portion in the PDCCH, it decodes the paging control information, and uses the paging control information to decode the PCH (paging channel) in the PD SCH. (If the UE does not detect the presence of the P-RNTI scrambled portion, the UE may return to its sleep state). The PCH contains the paging payload information. The paging payload information includes the IMSI of the device targeted by the page. The UE checks the included IMSI to determine if it equals the IMSI of the UE. If the included IMSI is the not the same as the IMSI of the UE, the UE may return to sleep state. (The page was not intended for this UE). Alternatively, if the included IMSI is equal to the IMSI of the UE, the UE may initiate a random access procedure to connect to the network.

The base station broadcasts system information, and the UE receives the system information. The system information includes parameters that are used by the UE to determine the frames and subframes in which the UE will wake up and look for the paging messages. These parameters may be found in SIB2 (System Information Block 2).

System Information Blocks (SIBs) provide information from the base station to the UEs about various parameters of both the Access Stratum and Non Access Stratum. The SIBs contain the parameters that are common for all the UEs in the same cell, and are traditionally broadcast in wireless technologies such as LTE.

SIB2 includes a default paging cycle $T_{def}$ (under pcchConfig: defaultPagingCycle) and a parameter nB. Those parameters are used by a UE to determine an identifier for a paging frame and an identifier for a paging occasion. A paging occasion (PO) is a subframe that may possibly include a paging message. A paging frame is a radio frame that may contain one or more paging occasions.

LTE has two timing units, these being the System Frame Number (SFN) and the Subframe Number. SFN is the timing unit in frame scale, and the Subframe Number is the timing unit at the subframe level. Knowledge of both the SFN and the Subframe Number allows location of a particular subframe in the LTE time domain. With respect to discontinuous reception, the paging frame identifier ($I_{PF}$) and the paging occasion identifier $I_{PO}$ allow the UE to know the exact timing when the UE is required to wake up to check for a paging message.

According to 3GPP Specification TS 36.304, a paging frame (PF) is any frame whose system frame number SFN satisfies $$SFN \bmod T = (T \text{ div } N)*(UE\_ID \bmod N),$$

where T is the DRX cycle of the UE. Any SFN satisfying this equation is said to be a paging frame identifier $I_{PF}$. Thus, the paging frame occurs periodically with a period of T radio frames. T is determined by the minimum of (a) the UE-specific DRX cycle, if a UE-specific DRX cycle is allocated by a higher layer, and (b) the default DRX cycle broadcasted in SIB2. If a UE-specific DRX cycle has not been configured by a higher layer, the default value is used. T can be any one of 32, 64, 128 or 256.

The parameter nB can be any one of the values 4T, 2T, T, T/2, T/4, T/8, T/16, T/32. As noted above, this parameter is provided in from SIB2.

The value N is given by N=min(T,nB), i.e., N is the minimum of T and nB.

UE_ID=IMSI mod 1024, where IMSI is in decimal format and stored in the USIM of the UE. (USIM is an acronym for Universal Subscriber Identity Module).

For the paging occasion identifier $I_{PO}$, the 3GPP Specification TS 36.304 defines $I_{PO}$ as shown in the table below, where $$Ns = \max(1, nB/T)$$

$$i\_s = (UE\_ID/N) \bmod Ns$$

TABLE

Paging Occasion (PO) for FDD

| Ns | $I_{PO}$ for i_s = 0 | $I_{PO}$ for i_s = 1 | $I_{PO}$ for i_s = 2 | $I_{PO}$ for i_s = 3 |
|---|---|---|---|---|
| 1 | 9 | n/a | n/a | n/a |
| 2 | 4 | 9 | n/a | n/a |
| 4 | 0 | 4 | 5 | 9 |

Figure 19A:
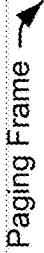
FIGS. 19a-c illustrate paging occasions respectively for Ns=1, 2 and 4, according to the prior art.
Figure 19B:
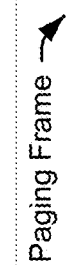
Figure 19C:
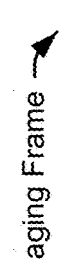

See also FIGS. 19a-19c for graphical depictions of each row of the above table. FIG. 19a shows that the case Ns=1 has only one paging occasion, occurring at subframe 9, and corresponding to i_s=0. The notation $P_{i\_s}=k$ underneath a given subframe number indicates that the subframe is a paging occasion corresponding i_s=k. FIG. 19b shows that the case Ns=2 has two paging occasions, occurring respectively at subframes numbers 4 and 9. FIG. 19c shows that the case Ns=4 has four paging occasions, occurring respectively at subframes numbers 0, 4, 5 and 9.

In order for the UE to improve its detection of the paging channel (PCH), the UE should be able to reliably detect the presence of P-RNTI in the PDCCH. Currently, PDCCH format 1A/1C is used for P-RNTI PDCCH. (See 3GPP Specification TS 36.212 for definition of formats 1A and 1C). The number of OFDM symbols carrying the PDCCH depends on the network configuration as well as the aggregation level. The term "aggregation level" refers to the number of Control Channel Elements (CCE) used for PDCCH.

PDCCH Paging Features for Range Extension

In one embodiment, a paging method uses PDCCH format 1C and CFI=4. CFI is the Control Format Indicator, and indicates the number of contiguous OFDM symbols used for carrying the PDCCH at the beginning of each subframe. (In the current LTE standard, CFI values 1, 2 and 3 are available, and CFI=4 is reserved for future use. We described here a use for the CFI=4 case). Thus, setting CFI=4 for a subframe means that 4 OFDM symbols are used for the PDCCH allocation.

Format 1C is similar to format 1A but more compact (less bits) in its information content, meaning that the information content can be encoded with lower coding rate (greater redundancy) in the PDCCH. Also, the aggregation level of the PDCCH may be changed from the maximum of 8 specified by current 3GPP specifications to a larger value, e.g., a value in the range from 9 to 32. (Unless otherwise stated, the expression, "the range from A to B", should be interpreted as a range inclusive of its endpoints A and B). In one embodiment, the aggregation level is set equal to 28. The aggregation level, also referred to as the CCE aggregation level, is the number of Control Channel Elements (CCEs) in a PDCCH. Each CCE contains 9 Resource Element Groups (REGs), which are distributed within the PDCCH. It is noted that the aggregation level of 28 corresponds to 25. Resource Blocks (RBs). In one embodiment, the paging method may use an aggregation level of 28 and a CFI=4, and thus, the performance of the UE in detecting the presence of P-RNTI in PDCCH format 1C is improved. However, a wide variety of other combinations of values are possible and contemplated.

Figure 5:
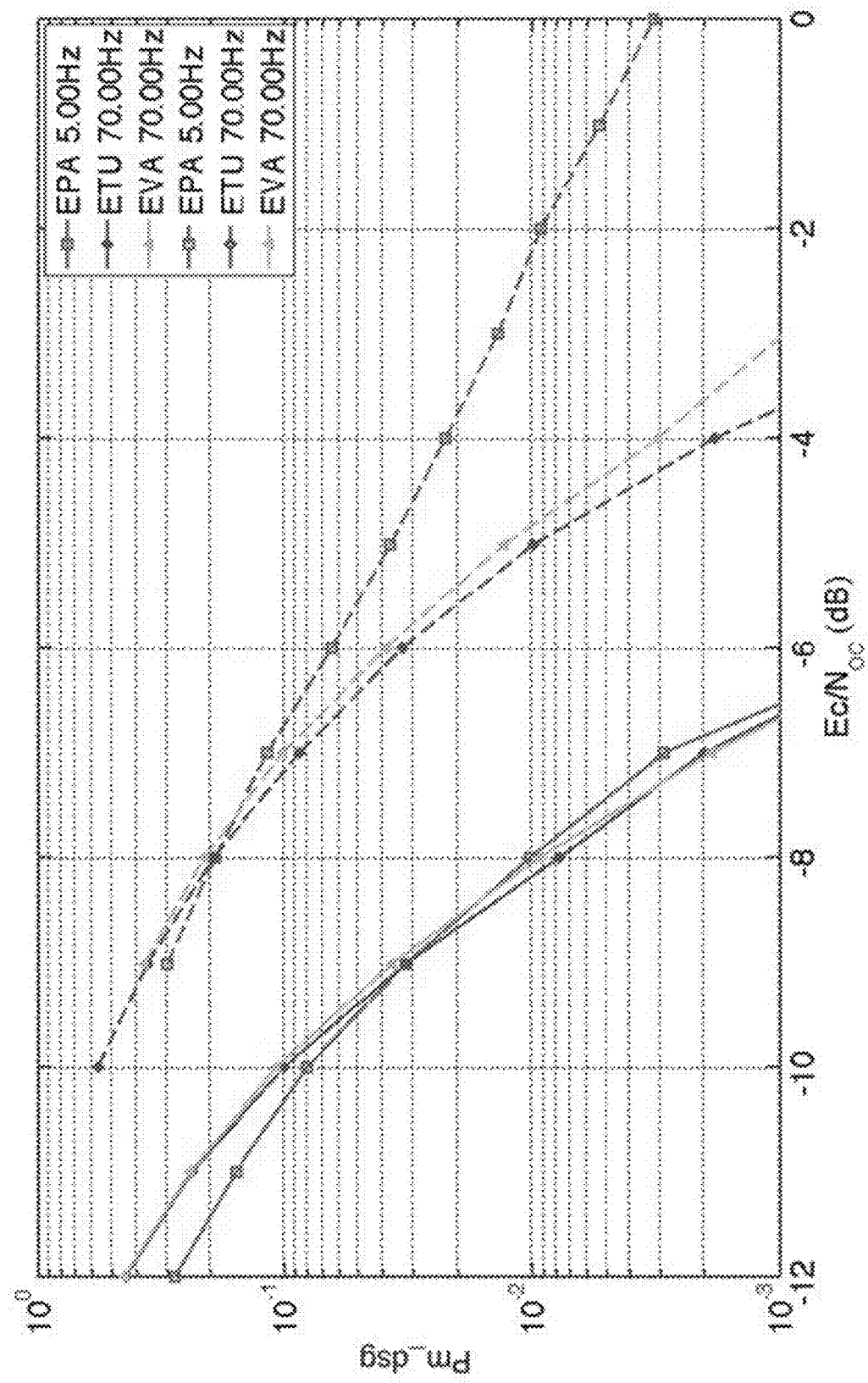
FIG. 5 shows PDCCH detection performance according to a prior art implementation with format 1C, aggregation level (AL) of 8, CFI=3. (PDCCH is an acronym for Physical Downlink Control Channel).

FIG. 5 shows the PDCCH detection performance according to a prior art implementation with format 1C, aggregation level (AL) of 8, CFI=3. The horizontal axis is Ec/Noc (dB), and the vertical axis is Pm_dsg. Furthermore, the performance of one receive antenna vs. two receive antennas is shown.

Figure 6:
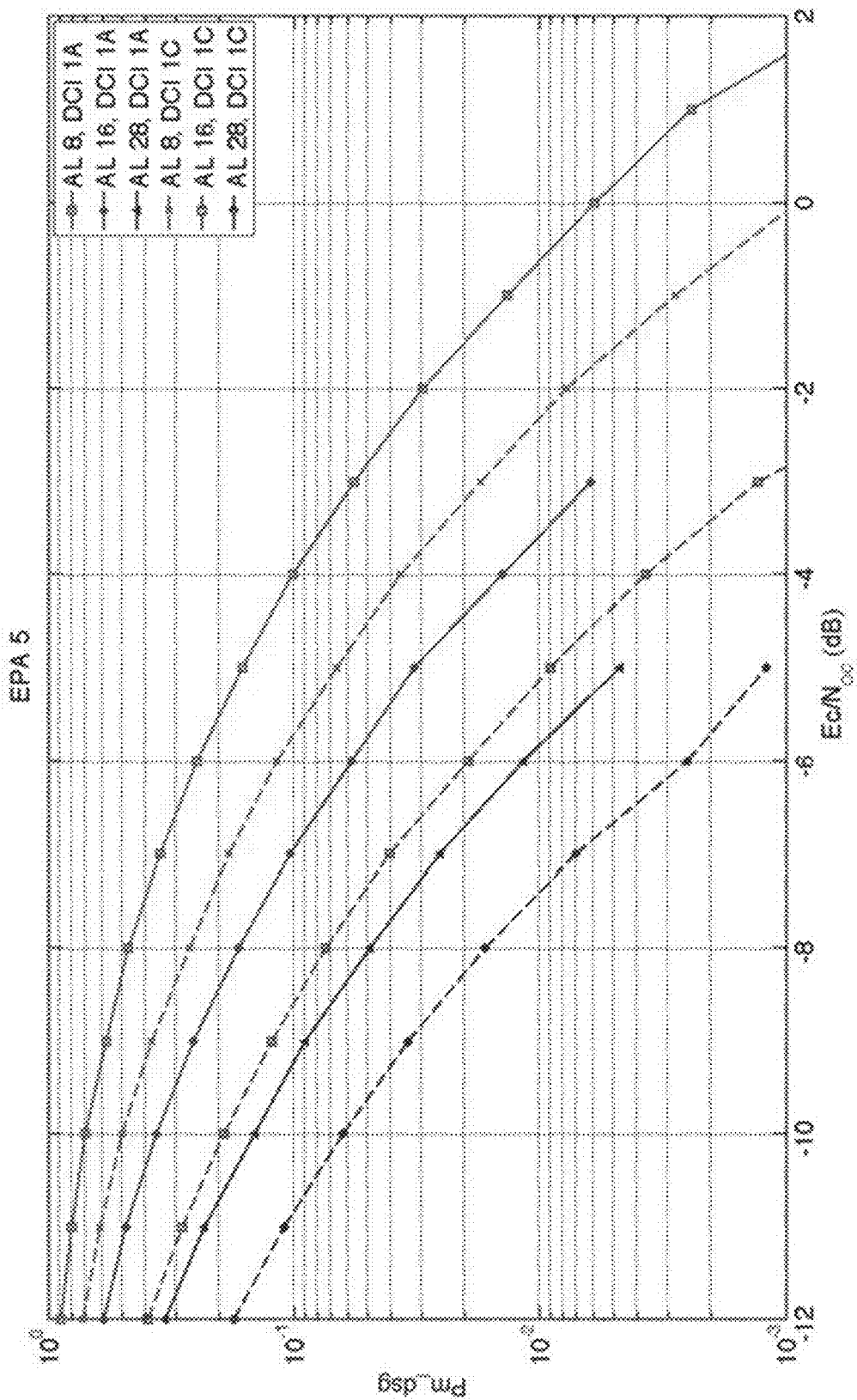
FIG. 6 shows the PDCCH detection performance according to some embodiments of the presently-disclosed PDCCH paging control information, using format 1C, aggregation level (AL) of 28, and CFI=4.

FIG. 6 shows the PDCCH detection performance according to the new PDCCH configuration, using format 1C, aggregation level (AL) of 28, and CFI=4 (with one receive antenna), according to some embodiments.

New P-RNTI for Link-Budget-Limited UE Devices

In order to simplify the decoding of the PDCCH, a new P-RNTI may be introduced. Similar to the conventional P-RNTI, this new P-RNTI will indicate the presence of a paging channel. However, the new P-RNTI will be used only for UEs that are link budget limited. UEs that are not link budget limited will use the conventional P-RNTI. Thus, when paging one or more UEs that are link budget limited, the base station may scramble at least a portion of the paging control information using the new P-RNTI. However, when paging UEs that are not link budget limited, the base station may scramble at least a portion of the paging control information using the conventional P-RNTI.

PDSCH Paging Features for Range Extension

In one embodiment, a paging method may use an increased number of PDSCH resource blocks for carrying the Paging Channel (PCH) payload for each UE, i.e., increased as compared to prior art. For example, the Paging Channel (PCH) payload for each UE may occupy 25 RBs, consistent with the above-described allocation of 25 RBs per UE in the PDCCH. (A variety of other RB allocation sizes are possible and contemplated). While the encoded PCH payload may occupy 25 RBs, the underlying information content of the PCH may be 41 bits, where 40 bits is for the IMSI (International Mobile Subscriber Identity) and 1 bit is for PS/CS (Packet-Switched/Circuit-Switched). Thus, if the UE supports both packet-switched and circuit-switched networks, a transport block size (TBS)=56 may be used. However, if the UE only supports LTE, then the 1 bit for PS/CS can be dropped, and a Transport Block Size (TBS)=40 may be used.

The above configuration for PCH payload helps to ensure that the coding rate of the payload information content is very low. (The information content occupies a larger set of resource blocks than prior art, allowing a lower coding rate, i.e., more redundancy). This feature increases the probability of successful decoding of the payload information content.

Figure 7:
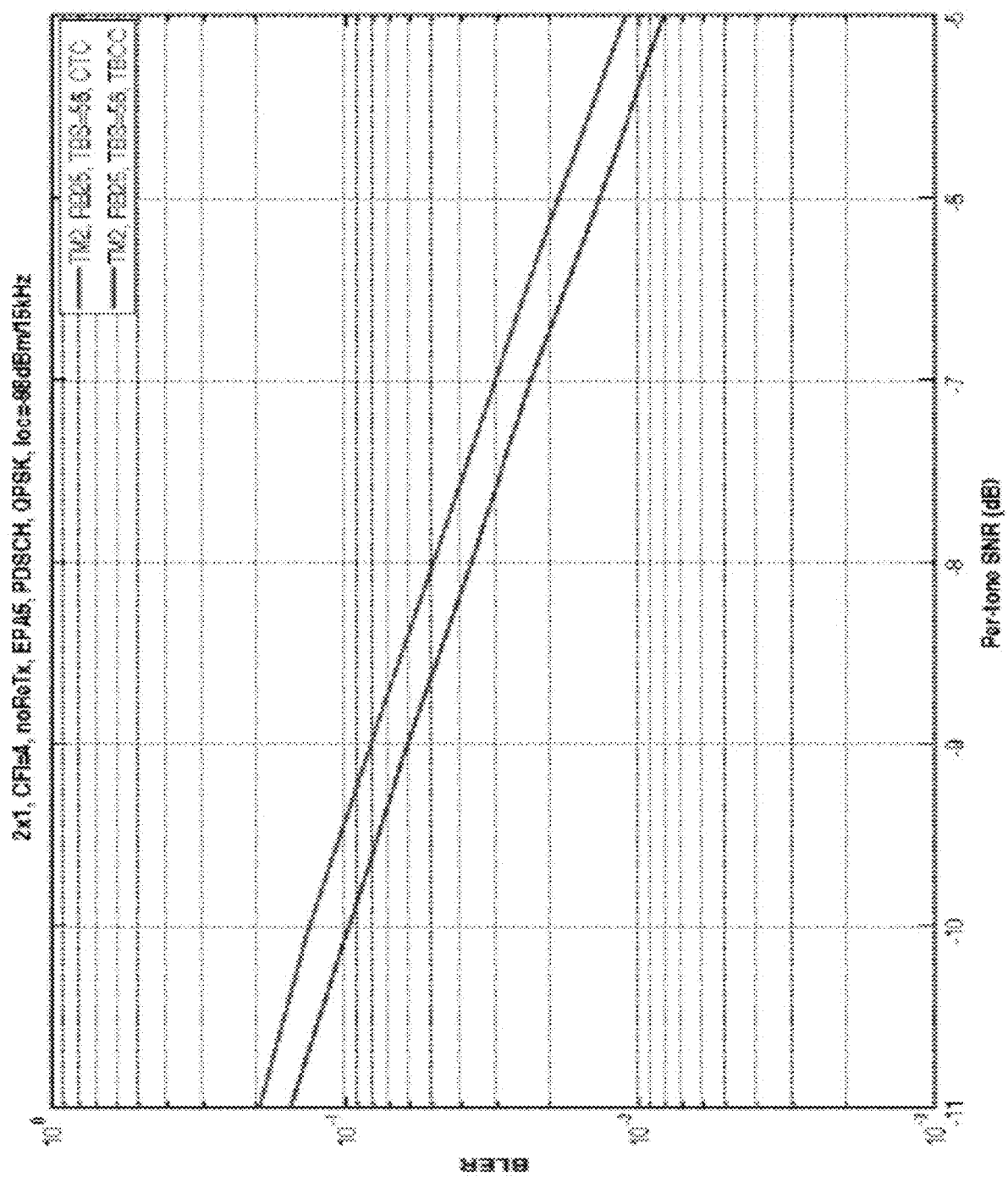
FIGS. 7 and 8 show the block error rate (BLER) performance according to some embodiments of the presently-disclosed PDSCH paging payload information.
Figure 8:
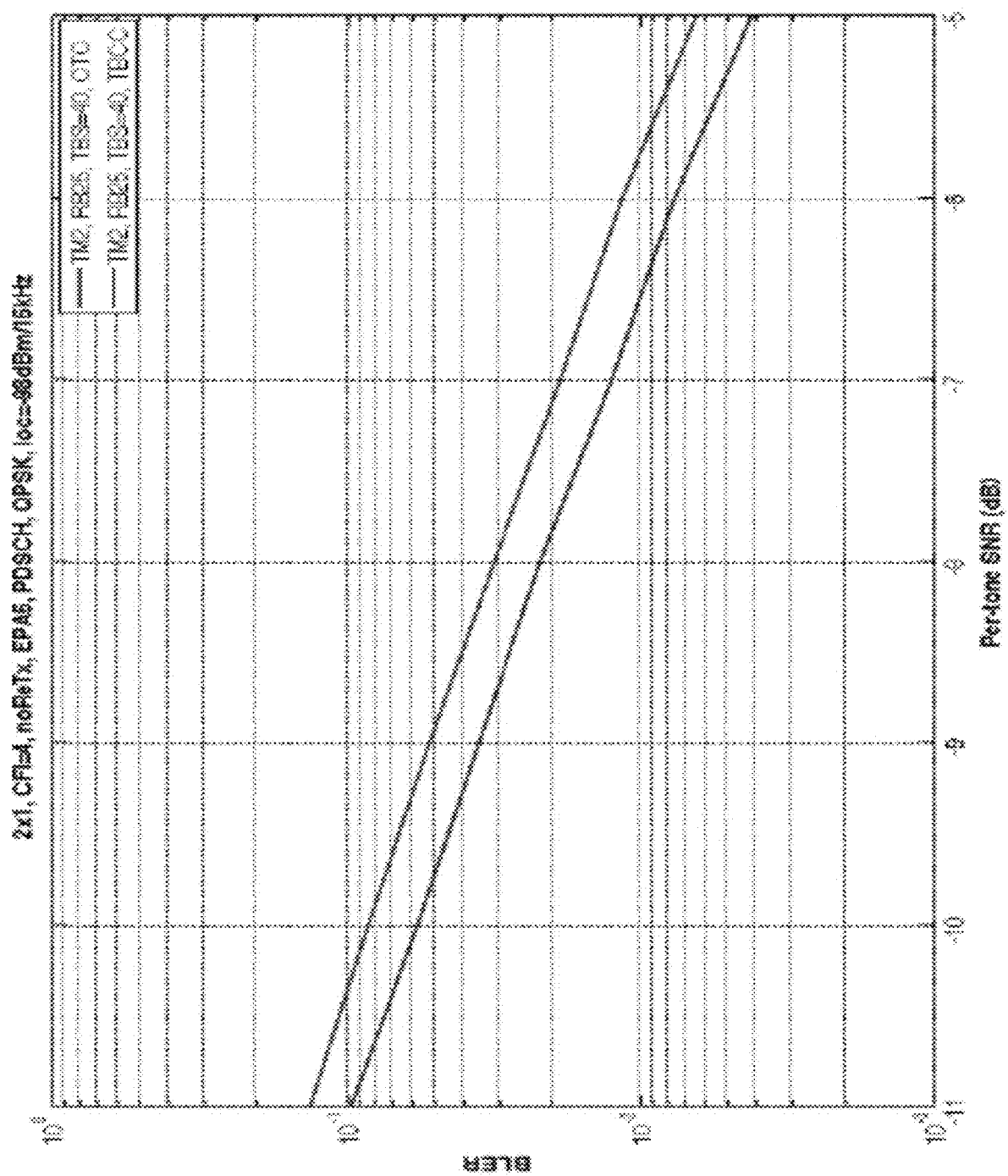

FIGS. 7 and 8 show the block error rate (BLER) performance for the above-described paging method, according to some embodiments. In FIG. 7, the upper curve corresponds to TM2, RB25, TBS=56 and CTC, and the lower curve corresponds to TM2, RB25, TBS=56 and TBCC. In FIG. 8, the upper curve corresponds to TM2, RB25, TBS=40 and CTC, and the lower curve corresponds to TM2, RB25, TBS=40 and TBCC.

PO/PF Configuration

As described above, in order to achieve successful decoding of paging, the paging resources per UE used in PDCCH and PDSCH are increased. This increased usage of resources in PDCCH and PDSCH may cause the PDCCH and/or PDSCH to become saturated, i.e., reach network capacity. For example, the PSCCH and/or PDSCH may reach network capacity when multiple link budget limited UEs are simultaneously being paged. To help alleviate this difficulty, in one embodiment, a paging method may operate to group the link budget limited UEs in a single PF and as few POs as possible.

The idle mode DRX cycle for link budget limited UEs may be larger than the idle mode DRX cycle typically used in the prior art. In the prior art, the idle mode DRX cycle is typically 1.28 s. In some embodiments, the idle mode DRX cycle for link budget limited UEs is greater than 1.28 s, e.g., may be set equal to 2.56 s=2×1.28 s, or 5.12 s=4×1.28 s.

In order to achieve the grouping of paging messages for link budget limited UEs under a single PF, in one embodiment a new UE_ID is created and signaled by the network in SIB2. (SIB2, as defined in the LTE specifications, does not have this capability. We propose an extension to the definition of SIB2, to support the signaling of this new UE_ID). This new UE_ID may be referred to herein as the "Range_UE_ID" to distinguish it from the conventional UE_ID (i.e., the UE_ID determined from the IMSI).

All of the UEs that are link budget limited may use this Range_UE_ID to compute the paging frame identifier $I_{PF}$. For example, the paging frame identifier may be computed based on the expression:

$$I_{PF}=SFN \bmod T=(T \text{ div } N)*(Range\_UE\_ID \bmod N).$$

Thus, the Range_UE_ID is a mechanism to group together the link-budget-limited UE devices so they are constrained to receive their paging message in frames consistent with the paging frame identifier $I_{PF}$. In contrast, the non-link-budget-limited UEs use the conventional IMSI-based UE_ID to determine paging frame identifiers, and thus, their paging frames are distributed in time, due to the randomness of the their IMSI values.

It is assumed here that the UE has already indicated to the network (e.g., during RRC exchange of the UE capability) that the UE is a link budget limited device. This information regarding link budget limited status may be retained at the Mobile Management Entity (MME) such as, but not limited to, during idle mode.

If the number of link budget limited devices is large and the network needs to reserve more than one paging frame for the link budget limited devices, then the network can broadcast (from the base station) a plurality of Range_UE_IDs in the SIB2. The UE may select one of the Range_UE_IDs based on the conventional UE_ID (i.e., the IMSI-based UE_ID). For example, in one embodiment, four Range_UE_IDs may be configured, and the UE may:

select Range_UE_ID1 if UE_ID<256;
select Range_UE_ID2 if 256≤UE_ID<512;
select Range_UE_ID3 if 512≤UE_ID<768; and
select Range_UE_ID4 if 768≤UE_ID<1024.

Since UE_ID=IMSI mod 1024, the UE_ID can only take values from 0 to 1023. The selected Range_UE_ID, denoted Range_UE_ID$_{SEL}$, may be used to compute the paging frame identifier $I_{PF}$ based on the expression:

$$I_{PF}=SFN \bmod T=(T \text{ div } N)*(Range\_UE\_ID_{SEL} \bmod N).$$

The number of Range_UE_IDs and the definition of selection ranges given above is meant as an illustrative example. The number of Range_UE_IDs may equal any value greater than one, and the selection ranges need not be uniform in width.

In some embodiments, pcch-Config of SIB2 may be extended as follows:
    pcch-Config
        defaultPagingCycle rf128,
        nB oneT
            defaultPagingCycleRange rf512,
            Range_UE_ID 100.

However, it should be understood that the specific parameter values given in this example may be widely varied in different contexts and application scenarios.

In some embodiments, the Range_UE_ID (or the plurality of Range_UE_IDs) may be predefined and known to the network and the UEs that are link budget limited. Thus, in these embodiments, the base station does not need to broadcast the Range_UE_ID(s). Each link-budget-limited UE may store the Range_UE_ID(s) in memory.

Alternative Method for Determination of Paging Occasion

In one embodiment, the table specifying the paging occasion identifier $I_{PO}$ as a function of Ns and i_s is modified in order to cope with the high load of link budget limited UEs. In particular, a new row may be added to this table to support determination of PO for link budget limited UEs. If the UE is link budget limited, the UE may use a fixed value of Ns (instead of computing Ns from parameter nB and DRX cycle T). For example, in one embodiment Ns=6 is reserved for link budget limited UEs. The fixed value of Ns may be used to compute i_s according to the conventional formula:

$$i\_s=(UE\_ID/N) \bmod Ns.$$

The computed value of i_s may then be used to select the paging occasion identifier $I_{PO}$ from a predetermined set of paging occasion identifier values. The predetermined set defines the contents of the new row in the paging occasion table. The predetermined set includes paging occasion identifier values that are not conventionally used for paging. (According to the LTE specifications, the paging occasion identifier values conventionally used for paging are the values 0, 4, 5 and 9). For example, in the case where the fixed value of Ns is 6, the predetermined set of paging occasion identifier values may be the set {1, 2, 3, 6, 7, 8}. Thus, the link budget limited UEs will use different paging occasions than UEs that are not link budget limited. If, in addition, paging frame identifier $I_{PF}$ is computed based on the Range_UE_ID, then the paging load can be spread across different frames.

While a link budget limited UE may use the new row to determine the paging occasion identifier $I_{PO}$ as described above, it may use either the conventional UE_ID or the Range_UE_ID to determine the paging frame identifier $I_{PF}$.

RRC Connected Mode

In another embodiment, in order to avoid the paging performance issue, the UEs that are categorized as link budget limited may always stay in connected mode, and operate using connected state DRX (C-DRX). (Thus, the link-budget-limited UEs do not need to be paged. They will read the PDCCH in the ON duration of the C-DRX). The C-DRX cycle used may be similar to the idle mode DRX (e.g., 1.28 s or 960 ms) in order to save power. The eNB will toggle the link budget limited UEs between short and long C-DRX cycle depending on the traffic and the network load. The network can still use PDCCH to order a RACH command in case the sync with the UE is lost.

Paging with Increased PDCCH Aggregation and Increased Bandwidth

Figure 9:
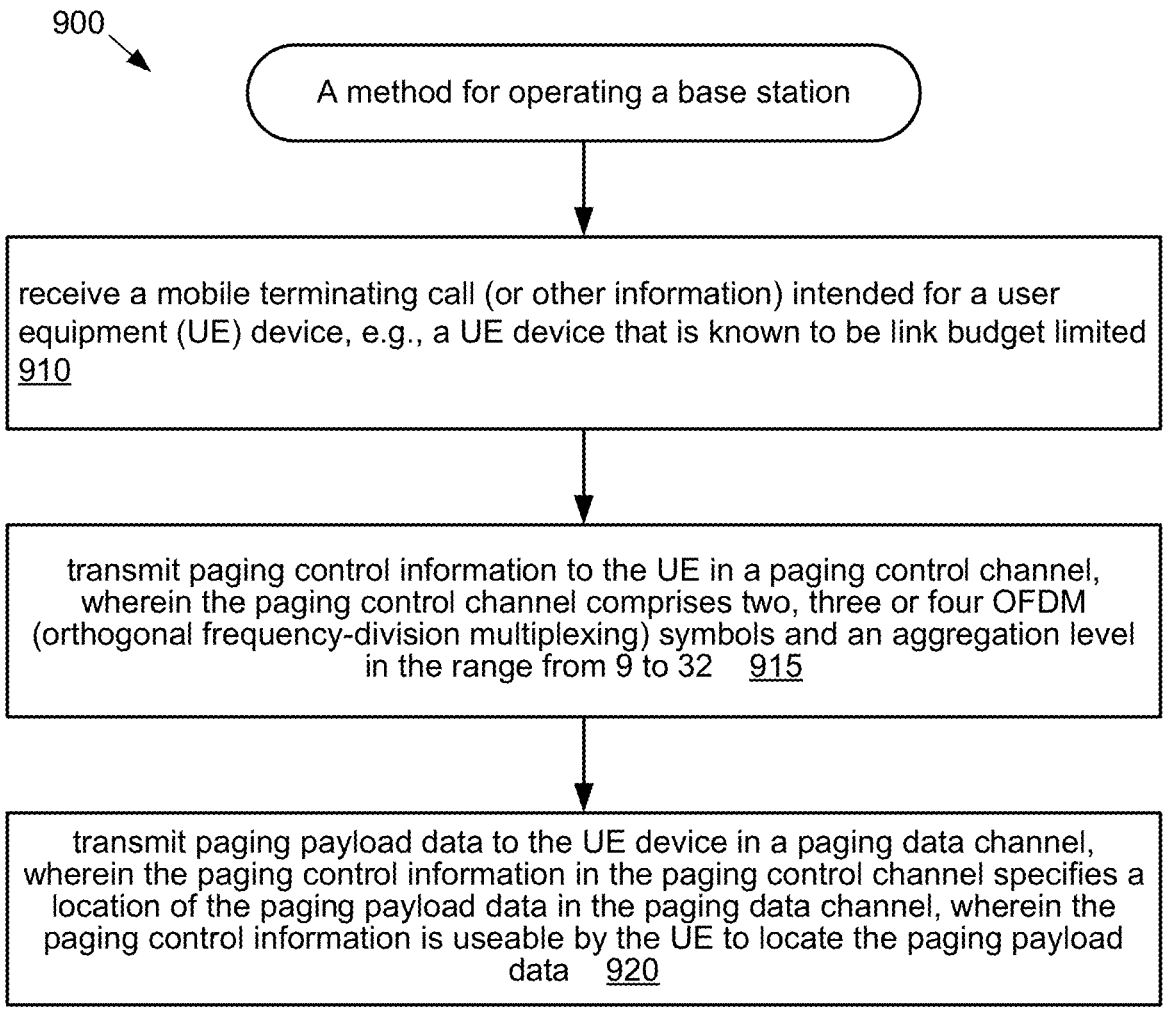
FIG. 9 illustrates a method for operating a base station to implement paging based on increased PDCCH aggregation level and increased PDCCH temporal width, according to some embodiments.

In one set of embodiments, a method 900 for operating a base station may include the operations shown in FIG. 9. (The method 900 may also include any subset of the features, elements and embodiments described above). The method 900 may be performed to provide improved paging performance in a cellular communication system, especially for UE devices that are link budget limited. The method 900 may be performed by a processing agent of the base station, e.g., by one or more processors executing program instructions, by dedicated digital circuitry such as one or more ASICs, by programmable hardware such as one or more FPGAs, or by any combination of the foregoing.

At 910, the base station may receive information (e.g., a mobile terminating call, or other information) intended for a user equipment (UE) device, e.g., a UE device that is known to be link budget limited. The information may be received from an infrastructure network of a wireless service provider or other network operator.

At 915, the base station may transmit paging control information to the UE in a paging control channel, where the paging control channel comprises two, three or four OFDM (orthogonal frequency-division multiplexing) symbols and an aggregation level in the range from 9 to 32.

At 920, the base station may transmit paging payload data to the UE device in a paging data channel, where the paging control information in the paging control channel specifies a location of the paging payload data in the paging data channel, where the paging control information is useable by the UE to locate the paging payload data. The term "location" refers here to a location in time-frequency resource space.

In some embodiments, the paging control channel is carried by Physical Downlink Control Channel (PDCCH) having format 1C as defined in 3GPP TS 36.212 and 36.213.

In some embodiments, the paging control information is encoded prior to inclusion in the paging control channel, where the paging control information is encoded with lower coding rate than specified in (or implied by) existing 3GPP standards.

In some embodiments, the paging control channel is carried by physical downlink control channel (PDCCH), and the paging data channel is carried by physical downlink shared channel (PDSCH).

In some embodiments, the paging control information occupies a number of resource blocks that is in the range from $n_{LOWER}$ to $n_{UPPER}$, where $n_{LOWER}$ is a value in the range {12, 13, 14, 15, 16}, where $n_{UPPER}$ is a value in the range from 22 to 48. The paging control information may include paging control information for all UEs being paged (or all UEs being paged within a PRNTI-specific group, if a plurality of PRNTIs are being used).

In one embodiment, the paging control information occupies a number of resource blocks that is in the range from 12 to 25, where the number of resource blocks depends on the aggregation level.

In some embodiments, the number of resource blocks occupied by the paging control information depends on the aggregation level. For example, the number of resource blocks may be an increasing function of the aggregation level.

In some embodiments, the paging payload data occupies a number of resource blocks that is in the range from $n_{LOWER}$ to $n_{UPPER}$, where $n_{LOWER}$ is a value in the range {12, 13, 14, 15, 16}, where $n_{UPPER}$ is a value in the range from 22 to 48.

In one embodiment, the paging payload data occupies a number of resource blocks that is in the range from 12 to 25.

In some embodiments, the number of resource blocks occupied by the paging control information is the same as the number of resource blocks occupied by the paging payload data.

In some embodiments, the paging payload data is less than or equal to 40 bits in length. This may be advantageous in contexts where a transport block size used to transmit the paging payload data is equal to 40 bits. (In LTE, transport block size is 40 bits).

In some embodiments, the UE device may be configured to support LTE but not WCDMA or GSM. In these embodiments, the paging payload data includes an international mobile subscriber identity (IMSI) of the UE, but does not include an indicator for selection between packet switched data transfer and circuit switched data transfer.

Figure 10:
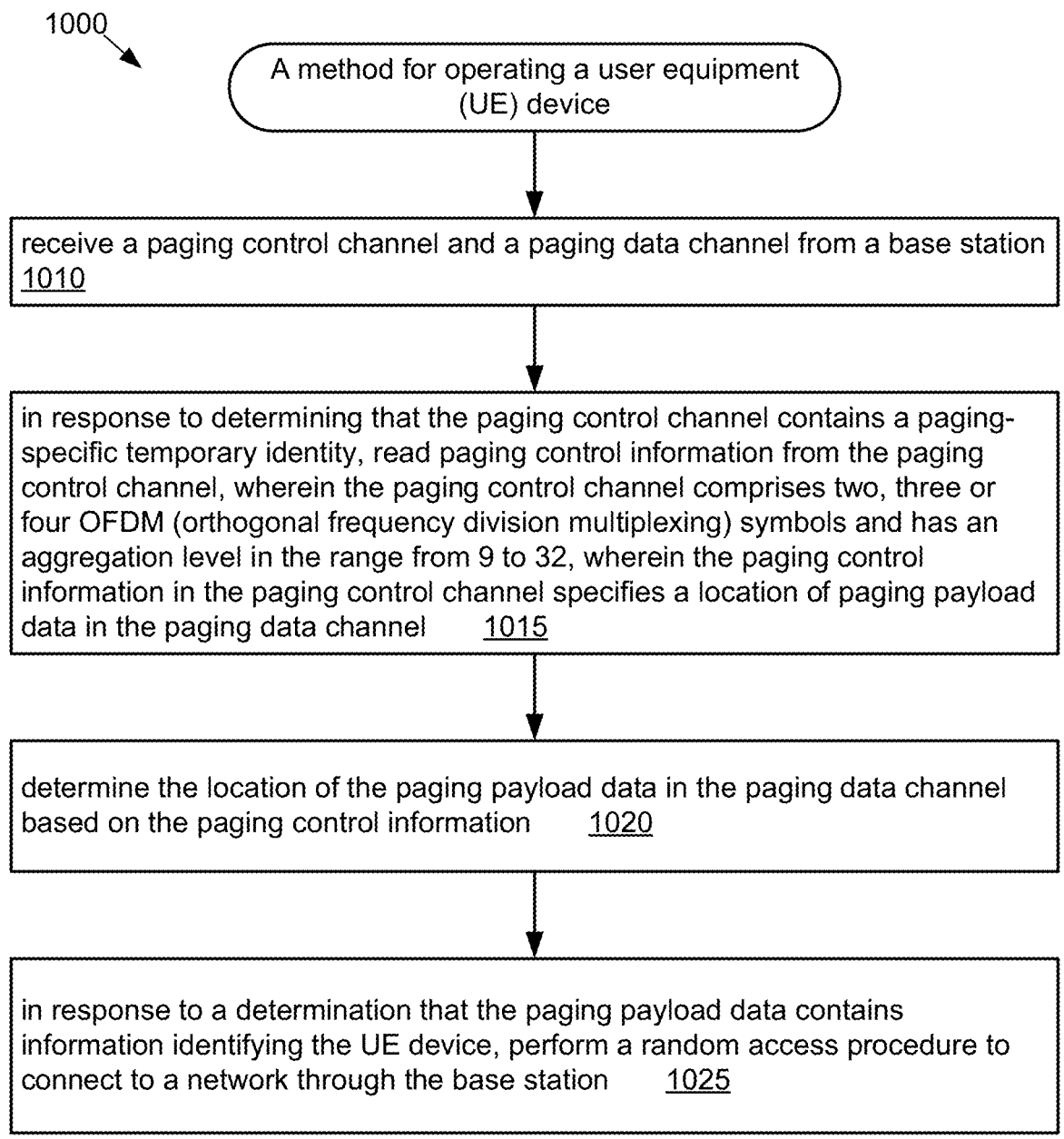
FIG. 10 illustrates a method for operating a user equipment device to receive paging based on increased PDCCH aggregation level and increased PDCCH temporal width, according to some embodiments.

In one set of embodiments, a method 1000 for operating a user equipment (UE) device may include the operations shown in FIG. 10. (The method 1000 may also include any subset of the features, elements and embodiments described above). The method 1000 may be performed to provide improved paging performance in a cellular communication system. The method 1000 may be performed by (and may be especially beneficial for) a UE device that is link budget limited. The method 1000 may be performed by a processing agent of the UE device, e.g., by one or more processors executing program instructions, by dedicated digital circuitry such as one or more ASICs, by programmable hardware such as one or more FPGAs, or by any combination of the foregoing.

At 1010, the UE device may receive a paging control channel and a paging data channel from a base station, e.g., a paging control channel and a paging data channel as variously described above.

At 1015, in response to determining that the paging control channel contains a paging-specific temporary identity, the UE device may read paging control information from the paging control channel. The paging control channel may include two, three or four OFDM (orthogonal frequency division multiplexing) symbols and have an aggregation level in the range from 9 to 32. The paging control information in the paging control channel may specify a location of paging payload data in the paging data channel.

At 1020, the UE device may determine the location of the paging payload data in the paging data channel based on the paging control information. The UE device may decode the paging payload data using the determined location.

At 1025, in response to a determination that the paging payload data contains information identifying the UE device, the UE device may perform a random access procedure to connect to a network through the base station. (Random access procedures are well known in the field of wireless communication).

In some embodiments, the paging control channel is a physical downlink control channel (PDCCH) having format 1C.

In some embodiments, the paging control channel is carried by physical downlink control channel (PDCCH) as defined in 3GPP TS 36.211, and the paging data channel is carried by physical downlink shared channel (PDSCH) as defined in 3GPP TS 36.211.

In some embodiments, the paging control information occupies a number of resource blocks that is in the range from $n_{LOWER}$ to $n_{UPPER}$, where $n_{LOWER}$ is a value in the range $\{12, 13, 14, 15, 16\}$, where $n_{UPPER}$ is a value in the range from 22 to 48.

In one embodiment, the paging control information occupies a number of resource blocks that is in the range from 12 to 25, where the number of resource blocks depends on the aggregation level.

In some embodiments, the number of resource blocks occupied by the paging control information depends on the aggregation level. For example, said number of resource blocks may be an increasing function of the aggregation level.

In some embodiments, the paging payload data occupies a number of resource blocks that is in the range from $n_{LOWER}$ to $n_{UPPER}$, where $n_{LOWER}$ is a value in the range $\{12, 13, 14, 15, 16\}$, where $n_{UPPER}$ is a value in the range from 22 to 48.

In one embodiment, the paging payload data occupies a number of resource blocks that is in the range from 12 to 25.

In some embodiments, the number of resource blocks occupied by the paging control information is the same as the number of resource blocks occupied by the paging payload data.

In some embodiments, the paging payload data is less than or equal to 40 bits in length, where a transport block size used to transmit the paging payload data is equal to 40 bits.

In some embodiments, the method 1000 may also include the UE device receiving a mobile terminating call after having connected to the network.

In one set of embodiments, a base station may be configured to perform wireless communication with a wireless UE device as follows. The base station includes a radio, and a processing agent operatively coupled to the radio. (The base station may also include any subset of the features, elements and embodiments described above). The processing agent is configured to: (a) receive a mobile terminating call intended for a user equipment (UE) device; (b) transmit paging control information to the UE device in a paging control channel, where the paging control channel comprises two, three or four OFDM (orthogonal frequency-division multiplexing) symbols and has an aggregation level in the range from 9 to 32; and (c) transmit paging payload data to the UE device in a paging data channel, where the paging control information in the paging control channel specifies a location of the paging payload data in the paging data channel, where the paging control information is useable by the UE to locate the paging payload data. The transmission operations (b) and (c) may be performed using the radio.

Determine Paging Frame (PF) from a Single New ID for Link-Budget-Limited UEs

Figure 11:
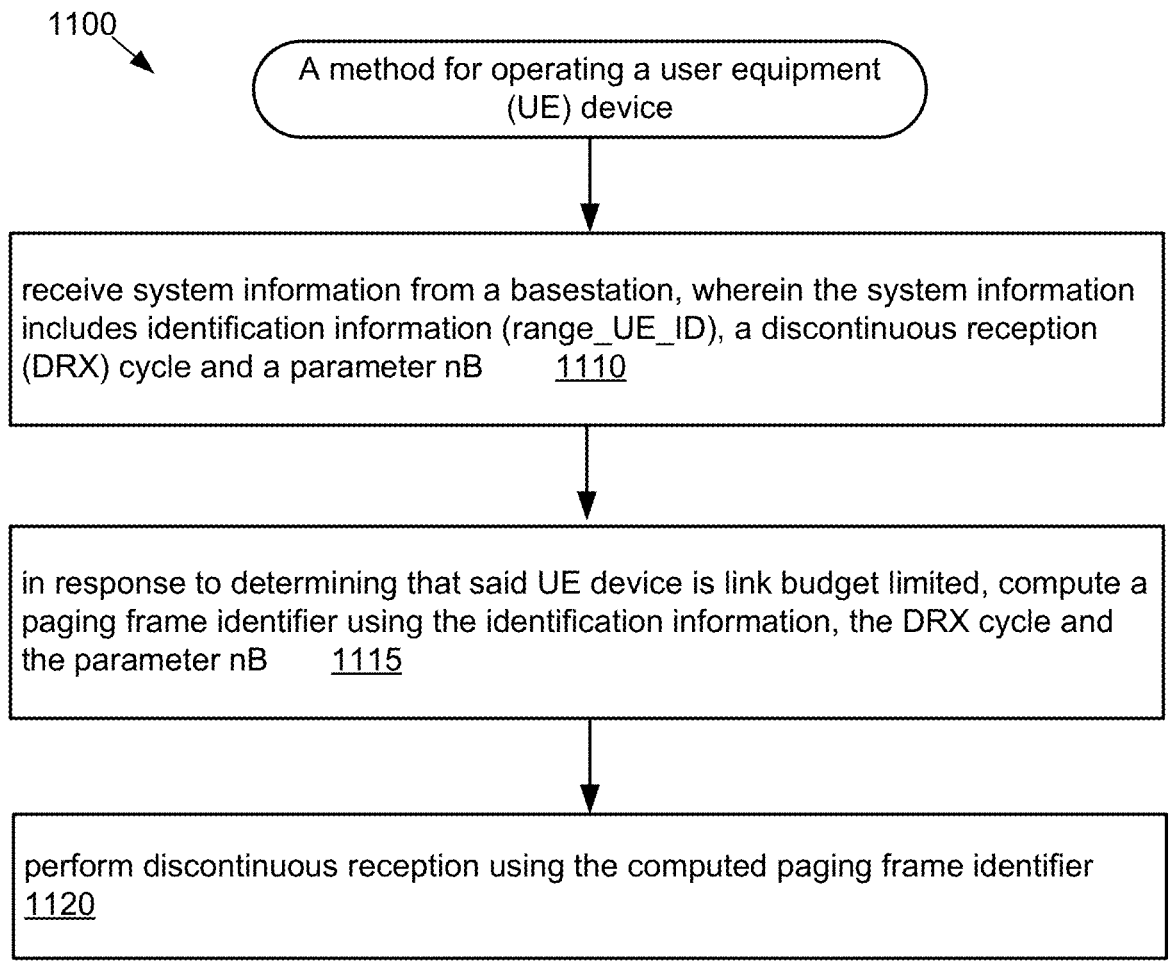
FIGS. 11 and 12 illustrate examples of a method for operating a user equipment device to determine a paging frame (PF) identifier based on a new ID when the user equipment device is link budget limited, according to some embodiments.

In one set of embodiments, a method 1100 for operating a user equipment (UE) device may include the operations shown in FIG. 11. (The method 1100 may also include any subset of the features, elements and embodiments described above). The method 1100 may be performed to provide improved paging performance in a cellular communication system. The method 1100 may be performed by (and especially beneficial for) a UE device that is link budget limited or a UE device that has become link budget limited. (The status of being link budget limited may vary dynamically, or may be a permanent condition). The method 1100 may be performed by a processing agent of the UE device, e.g., by one or more processors executing program instructions, by dedicated digital circuitry such as one or more ASICs, by programmable hardware such as one or more FPGAs, or by any combination of the foregoing.

At 1110, the UE device may receive system information from a base station. The system information may include identification information (e.g., the range_UE_ID described above), a discontinuous reception (DRX) cycle and a parameter nB. The DRX cycle indicates the temporal period according to which the UE device is to periodically wake up and check for a paging message. The identification information is preferably not unique to the UE device, but is dedicated for use by UE devices that are link budget limited. (UE devices that are not link budget limited may simply ignore the identification information).

At 1115, in response to determining that said UE device is link budget limited, the UE device may compute a paging frame identifier using the identification information, the DRX cycle and the parameter nB. (The identification information may take the place typically held by the IMSI-based UE_ID in conventional computations of page frame identifier, e.g., conventional computations as specified in the LTE specifications). The page frame identifier identifies the frames which are allowed to carry page messaging. The UE device may determine whether it is link budget limited in any of various ways, e.g., by detecting power of the base station's downlink signal relative to interference signals, by detecting a downlink error rate, by determining the number of HARQ retransmissions in the downlink, or any combination of the foregoing. In some embodiments, the UE's status of being link budget limited may be by design, and thus, the UE device need not perform any determination of link budget limited status. (Knowledge of that status may be built into the control mechanism/algorithm of the UE device).

At 1120, the UE device may perform discontinuous reception using the computed paging frame identifier. Discontinuous reception involves periodically waking from a low (or lower) power state to check for the occurrence of a page message directed to the UE device. The page frame identifier is used to determine the period between successive wake-up times, e.g., as variously described above.

Figure 12:
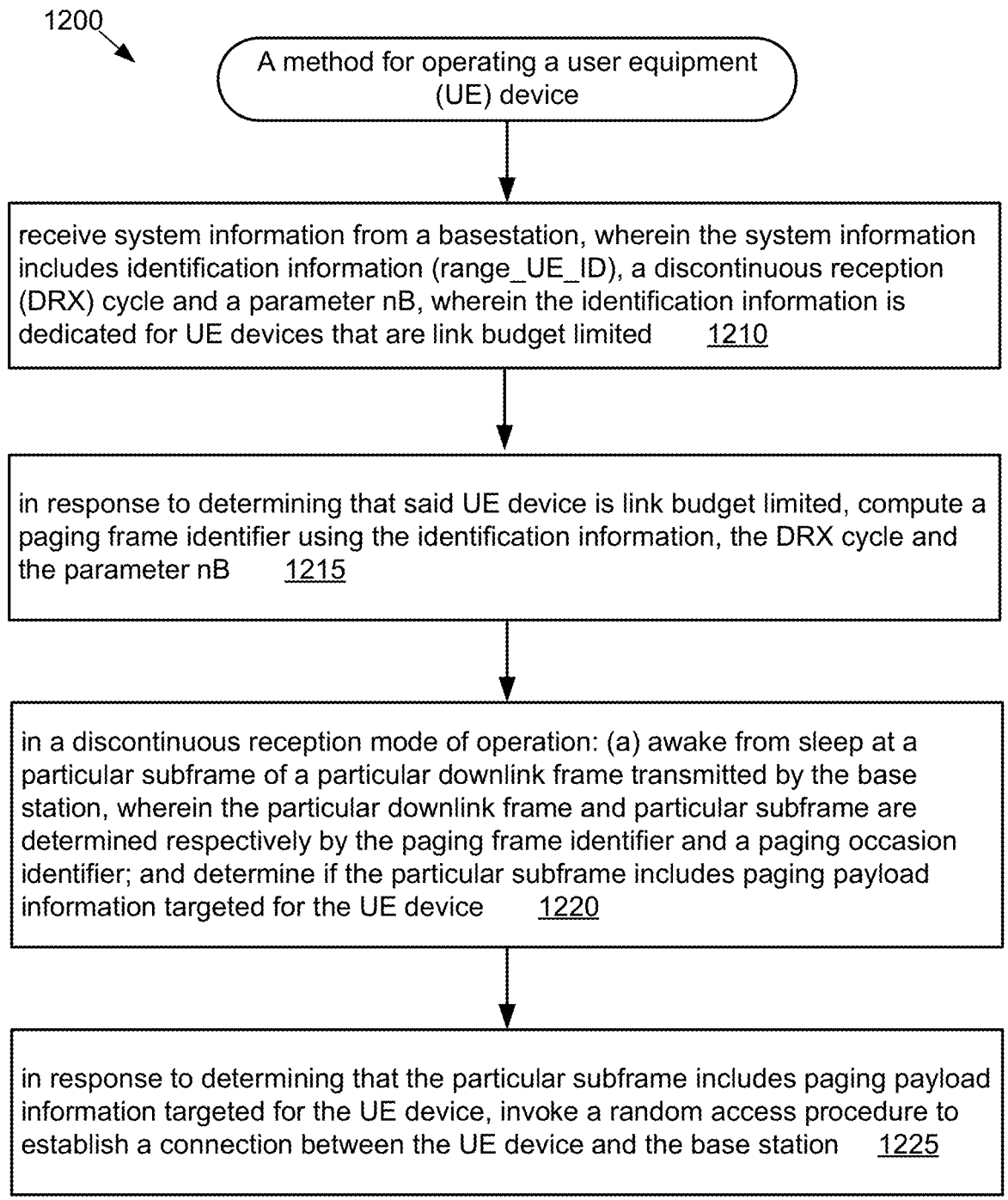

In one set of embodiments, a method 1200 for operating a user equipment (UE) device may include the operations shown in FIG. 12. (The method 1200 may also include any subset of the features, elements and embodiments described above). The method 1200 may be performed to provide improved paging performance in a cellular communication system. The method 1200 may be performed by (and especially beneficial for) a UE device that is link budget limited or a UE device that has become link budget limited. (The status of being link budget limited may vary dynamically, or may be a permanent condition).

At 1210, the UE device may receive system information from a base station, where the system information includes: identification information (e.g., the range_UE_ID described above) that is dedicated for use by UE devices that are link budget limited; a discontinuous reception (DRX) cycle; and a parameter nB. (UE devices that are not link budget limited may simply ignore the identification information). The base station may broadcast the system information, e.g., as part of SIB2.

At 1215, in response to determining that said UE device is link budget limited, the UE device may compute a paging frame identifier using the identification information, the DRX cycle and the parameter nB. Furthermore, each of the link-budget-limited UE devices in communication with the base station may similarly compute its paging frame identifier based on the same identification information, with the result that each link-budget-limited UE device uses the same value of paging frame identifier, and wakes up in the same radio frame of the DRX cycle to check for paging messages. Thus, for the purpose of paging, the link-budget-limited UEs are "grouped together" in the same radio frame. The base station may be configured to send paging messages for the link-budget-limited UE devices only in radio frames consistent with the common value of paging frame identifier.

At 1220, in a discontinuous reception (DRX) mode of operation, the UE device may: wake from sleep at a particular subframe of a particular downlink frame transmitted by the base station, where the particular downlink frame and particular subframe are determined respectively by the paging frame identifier and a paging occasion identifier; and determine if the particular subframe includes paging payload information targeted for the UE device. This determination may involve examining the paging payload information to determine if the IMSI (or more generally, the subscriber identity) of the UE device is included in the paging payload information.

At 1225, in response to determining that the particular subframe includes paging payload information targeted for the UE device, the UE device may invoke a random access procedure to establish a connection between the UE device and the base station. Random access procedures are well known in the field of wireless communication, and thus, need not be explained here.

In some embodiments, the method 1200 may also include the following action. In response to said determining that the UE device is link budget limited, the UE device may determining the paging occasion identifier based on a subscriber identity of the UE device, the DRX cycle and the parameter nB.

In some embodiments, the action of determining the paging occasion identifier includes: computing a parameter Ns based on the DRX cycle and the parameter nB, where the parameter Ns represents a number of available paging occasions per paging frame; computing an index i_s based on the subscriber identity of the UE device, the DRX cycle and the parameter nB, where the index i_s indicates one of the available paging occasions; and accessing an identifier value for said one of the available paging occasions from a table using the parameter Ns and index i_s.

In some embodiments, the method 1200 may also include, in response to said determining that the UE device is link budget limited, determining the paging occasion identifier based on the identification information, the DRX cycle and the parameter nB.

In some embodiments, the action of determining the paging occasion identifier includes: computing a parameter Ns based on the DRX cycle and the parameter nB, where the parameter Ns represents a number of available paging occasions per paging frame; computing an index i_s based on the identification information, the DRX cycle and the parameter nB, where the index i_s indicates one of the available paging occasions; and accessing an identifier value for said one of the available paging occasions from a table using on the parameter Ns and index i_s.

In some embodiments, the method 1200 may also include, in response to said determining that the UE device is link budget limited, determining the paging occasion identifier by performing the following operations. (A) The UE device may compute an index i_s based on: a fixed value of parameter Ns; a subscriber identity of the UE device; the DRX cycle; and the parameter nB. The fixed value is used by UE devices that are link budget limited. The index i_s indicates a paging occasion identifier value from a fixed set of available paging occasion identifier values. The fixed set of available paging occasion identifier values is disjoint from a conventional set of paging occasion identifier values used by UE devices that are not link budget limited. (The base station transmits paging to non-link-budget-limited UE devices in the conventional fashion, using subframes consistent with the conventional set of paging occasion identifier values). (B) The link-budget-limited UE device may then access said paging occasion identifier value from a table including at least the fixed set of available paging occasion identifier values using the index i_s.

In some embodiments, the fixed value of parameter Ns is not a member of the set {1, 2, 4}. For example, in some embodiments, the fixed value is equal to 6.

In some embodiments, the conventional set of paging occasion identifier values is defined by the set of subframe indices {0, 4, 5, 9}.

In some embodiments, the above-described fixed set of available paging occasion identifier values is defined by the set of subframe indices {1, 2, 3, 6, 7, 8}.

In some embodiments, the number Ns of the available paging occasion identifier values in said fixed set is greater than or equal to six. The index i_s may be computed based in part on the number Ns.

Figure 13:
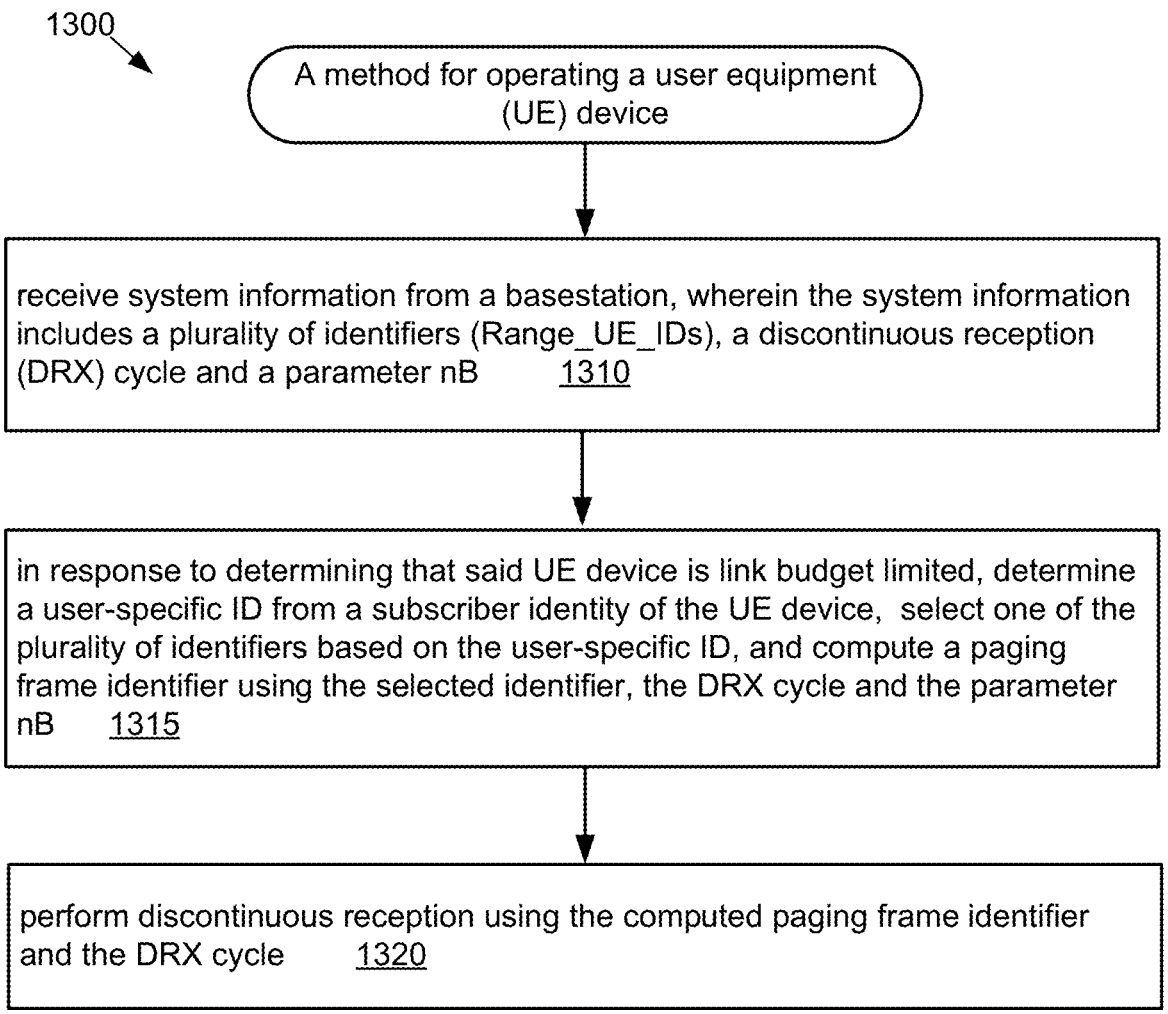
FIGS. 13 and 14 illustrate examples of a method for determining a paging frame (PF) identifier at a link-budget-limited user equipment device based on a selected one of a plurality of new IDs dedicated for use by link budget limited devices, according to some embodiments.

Paging Frame (PF) Determined from One of a Set of New IDs for Link-Budget-Limited UEs In one set of embodiments, a method 1300 for operating a user equipment (UE) device may include the operations shown in FIG. 13. (The method 1300 may also include any subset of the features, elements and embodiments described above). The method 1300 may be performed to provide improved paging performance in a cellular communication system. The method 1300 may be performed by (and especially beneficial for) a UE device that is link budget limited or a UE device that has become link budget limited. (The status of being link budget limited may vary dynamically, or may be a permanent condition).

At 1310, the UE device may receive system information from a base station, where the system information includes: one or more of a plurality of identifiers (e.g., the above-described Range_UE_IDs); a discontinuous reception (DRX) cycle; and a parameter nB. The identifiers are preferably dedicated for use by UE devices that are link budget limited, and thus, may be referred to as LBL-paging identifiers. In other words, the base station transmits (or broadcasts) one or more of these identifiers only when paging a UE device(s) that is (are) known to be link budget limited.

At 1315, in response to determining that said UE device is link budget limited, the UE device may: determine a user-specific ID from a subscriber identity of the UE device; select one of the plurality of identifiers based on the user-specific ID; and compute a paging frame identifier using the selected identifier, the DRX cycle and the parameter nB. The user-specific ID may be determined from the subscriber identity (e.g., IMSI) in a conventional manner. The selection of one of the identifiers may be performed according to a mapping (or function) from a set of possible user-specific IDs to the plurality of identifiers. The mapping (or function) is known by the base station or the network infrastructure node(s) responsible for generation of paging messages. According to the mapping, different link-budget-limited UE devices will map to different ones of the identifiers. The base station is constrained to transmit paging for any given link-budget-limited UE device on a radio frame agreeing with the corresponding identifier. Thus, the paging messages for link-budget-limited UE devices are spread out over a plurality of paging frames. This mechanisms allows a larger number of link-budget-limited UE devices to be served with paging messages than if only a single paging identifier were used for all link-budget-limited UE device.

At 1320, the UE device may perform discontinuous reception using the computed paging frame identifier and the DRX cycle.

Figure 14:
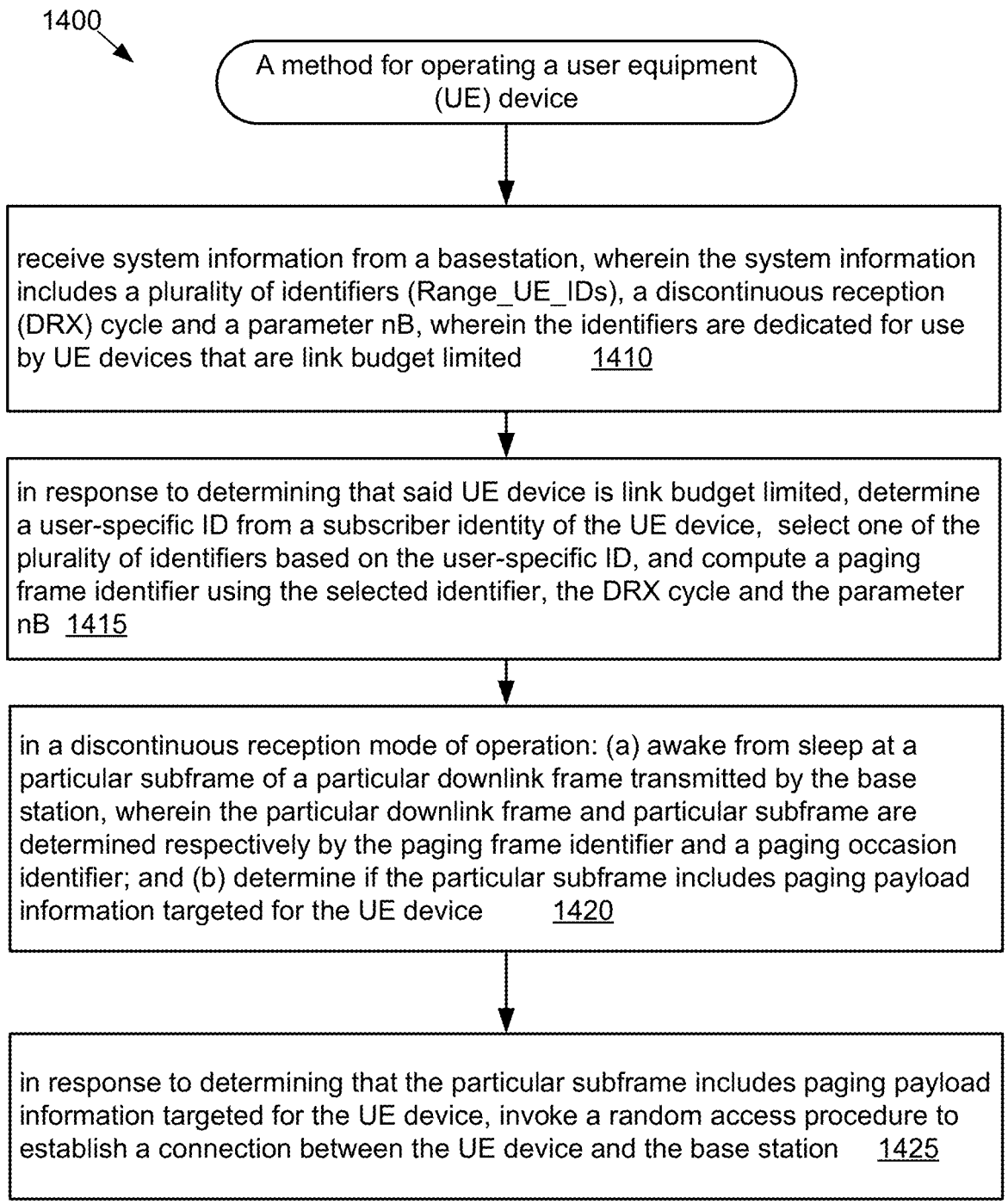

In one set of embodiments, a method 1400 for operating a user equipment (UE) device may include the operations shown in FIG. 14. (The method 1400 may also include any subset of the features, elements and embodiments described above). The method 1400 may be performed to provide improved paging performance in a cellular communication system. The method 1400 may be performed by (and especially beneficial for) a UE device that is link budget limited or a UE device that has become link budget limited.

At 1410, the UE device may receive system information from a base station, where the system information includes a plurality of identifiers (Range_UE_IDs), a discontinuous reception (DRX) cycle and a parameter nB, where the identifiers are dedicated for use by UE devices that are link budget limited. (The identifiers may simply be ignored by UE device that are not link budget limited).

At 1415, in response to determining that said UE device is link budget limited, the UE device may: determine a user-specific ID from a subscriber identity of the UE device; select one of the plurality of identifiers based on the user-specific ID; and compute a paging frame identifier using the selected identifier, the DRX cycle and the parameter nB.

At 1420, in a discontinuous reception mode of operation, the UE device may: wake from sleep at a particular subframe of a particular downlink frame transmitted by the base station, where the particular downlink frame and particular subframe are determined respectively by the paging frame identifier and a paging occasion identifier; and determine if the particular subframe includes paging payload information targeted for the UE device.

At 1425, in response to determining that the particular subframe includes paging payload information targeted for the UE device, the UE device may invoke a random access procedure to establish a connection between the UE device and the base station.

In some embodiments, the action of selecting one of the plurality of identifiers includes: determining which of a plurality of disjoint ranges the user-specific ID occurs within, where each of the ranges is associated with a respective one of the identifiers; and selecting the identifier that corresponds to the determined range.

Determine Paging Occasion (PO) from Modified Ns/i_s Table

Figure 15:
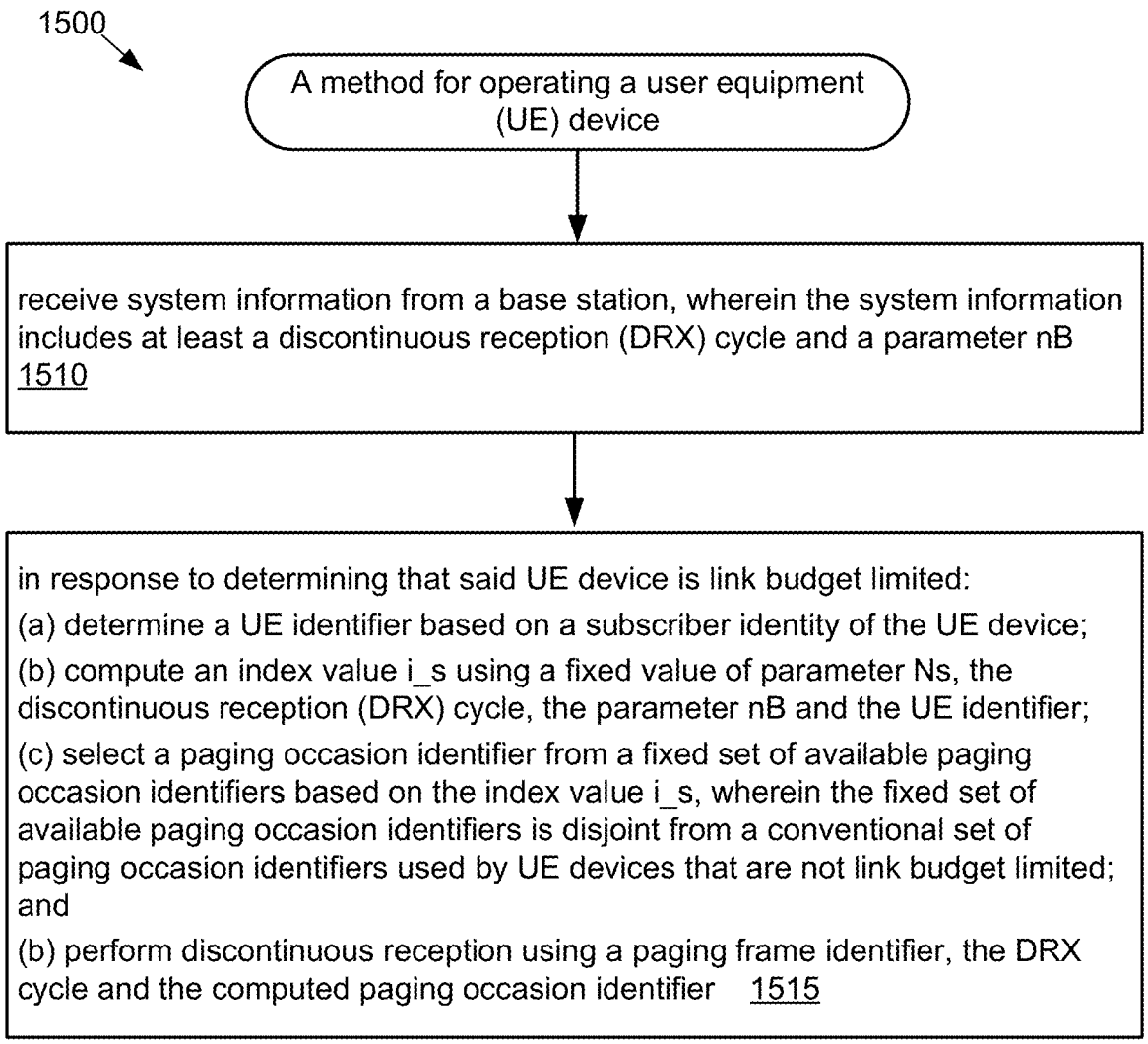
FIGS. 15 and 16 illustrate examples of a method for determining a paging occasion identifier at a UE device based on a new set of paging occasion identifier values that is dedicated for use by link budget limited devices, where the new set is disjoint from the set of paging occasion identifier values used by conventional UE devices for paging, according to some embodiments.

In one set of embodiments, a method 1500 for operating a user equipment (UE) device may include the operations shown in FIG. 15. (The method 1500 may also include any subset of the features, elements and embodiments described above). The method 1500 may be performed to provide improved paging performance in a cellular communication system. The method 1500 may be performed by (and especially beneficial for) a UE device that is link budget limited or a UE device that has become link budget limited.

At 1510, the UE device may receive system information from a base station, where the system information includes at least a discontinuous reception (DRX) cycle and a parameter nB.

At 1515, in response to determining that said UE device is link budget limited, the UE device may perform the following operations. (a) Determine a UE identifier based on a subscriber identity of the UE device. (b) Compute an index value i_s using: a fixed value of parameter Ns; the discontinuous reception (DRX) cycle; the parameter nB; and the UE identifier. (c) Select a paging occasion identifier from a fixed set of available paging occasion identifiers based on the index value i_s. The fixed set of available paging occasion identifiers is disjoint from a conventional set of paging occasion identifiers used by UE devices that are not link budget limited. The base station is configured to transmit paging for link-budget-limited UE device on subframes consistent with the fixed set of paging occasion identifiers, and to transmit paging for non-link-budget-limited UE devices on subframes consistent with the conventional set of paging occasion identifiers. Thus, the paging for different types of UE device is distributed to different sets of subframes. (d) Perform discontinuous reception (DRX) using a paging frame identifier, the DRX cycle and the computed paging occasion identifier.

Each UE device that is link budget limited may use the fixed value of Ns while each UE device that is not link budget limited may determine the value of parameter Ns in a conventional fashion (as defined by the LTE specifications).

Figure 16:
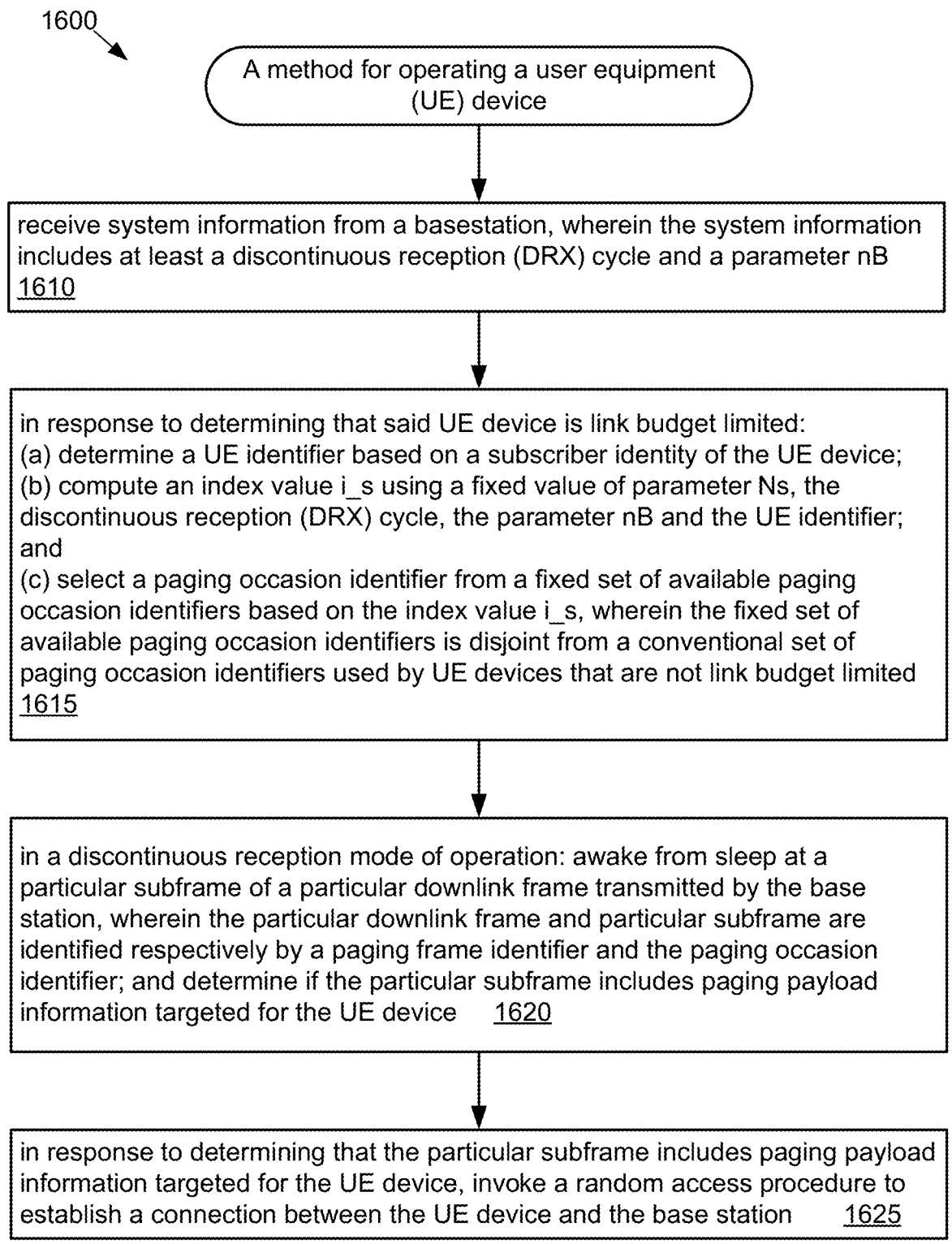

In one set of embodiments, a method 1600 for operating a user equipment (UE) device may include the operations shown in FIG. 16. (The method 1600 may also include any subset of the features, elements and embodiments described above). The method 1600 may be performed to provide improved paging performance in a cellular communication system. The method 1600 may be performed by (and especially beneficial for) a UE device that is link budget limited or a UE device that has become link budget limited.

At 1610, the UE device may receive system information from a base station, where the system information includes at least a discontinuous reception (DRX) cycle and a parameter nB.

At 1615, in response to determining that said UE device is link budget limited, the UE device may perform the following operations. (a) Determine a UE identifier based on a subscriber identity of the UE device. (b) Compute an index value i_s using a fixed value of parameter Ns, the discontinuous reception (DRX) cycle, the parameter nB and the UE identifier. UE devices that are link budget limited may use the fixed value of the parameter Ns to compute i_s while UE devices that are not link budget limited may use the value of Ns as defined by existing LTE specifications. (c) Select a paging occasion identifier from a fixed set of available paging occasion identifiers based on the index value i_s, where the fixed set of available paging occasion identifiers is disjoint from a conventional set of paging occasion identifiers used by UE devices that are not link budget limited.

At 1620, in a discontinuous reception (DRX) mode of operation, the UE device may: wake from sleep at a particular subframe of a particular downlink frame transmitted by the base station, where the particular downlink frame and particular subframe are identified respectively by a paging frame identifier and the paging occasion identifier; and determine if the particular subframe includes paging payload information targeted for the UE device.

At 1625, in response to determining that the particular subframe includes paging payload information targeted for the UE device, the UE device may invoke a random access procedure to establish a connection between the UE device and the base station.

In some embodiments, the fixed value of Ns is not a member of the set {1, 2, 4}. For example, in some embodiments, the fixed value is equal to 6.

In some embodiments, the conventional set of paging occasion identifiers is specified by the set of subframe indices {0, 4, 5, 9}.

In some embodiments, the system information also includes identification information dedicated for use by UEs that are link budget limited, where the paging frame identifier is determined based on the identification information, the discontinuous reception (DRX) cycle and the parameter nB.

In some embodiments, the paging frame (PO) is determined based on a subscriber identity (e.g., IMSI) of the UE device, the discontinuous reception (DRX) cycle and the parameter nB.

Connected-State DRX Mode

Figure 17:
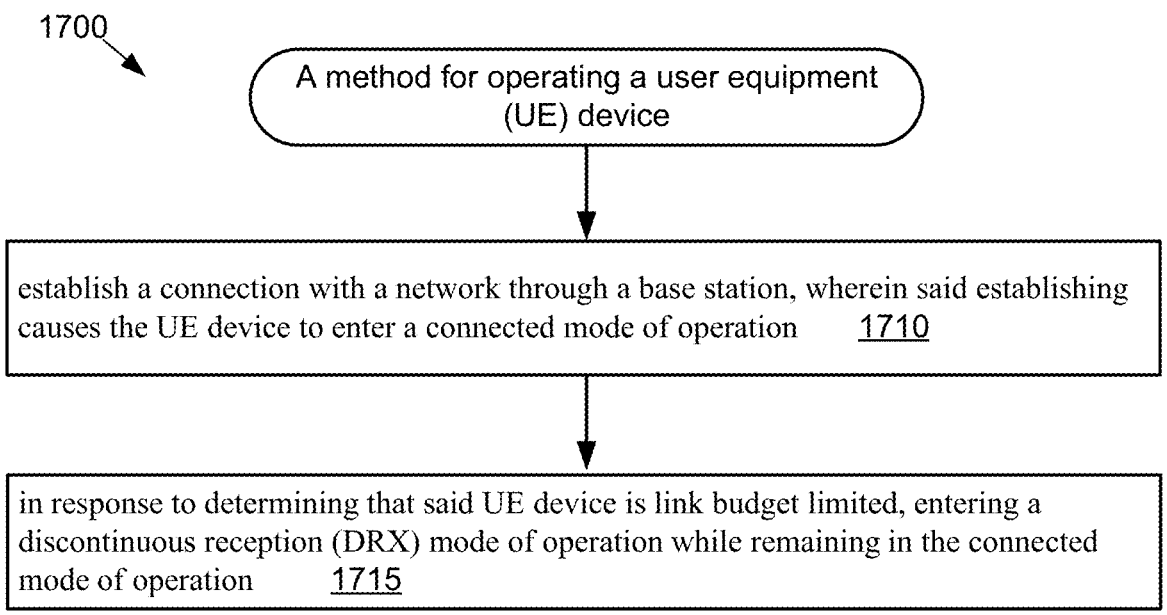
FIG. 17 illustrates a method for operating a UE device in a connected-state DRX mode, according to some embodiments. (DRX is an acronym for discontinuous reception).

In one set of embodiments, a method 1700 for operating a user equipment (UE) device may include the operations shown in FIG. 17. (The method 1700 may also include any subset of the features, elements and embodiments described above). The method 1700 may be performed by (and especially beneficial for) a UE device that is link budget limited or a UE device that has become link budget limited.

At 1710, the UE device may establish a connection with a network through a base station, where said establishing causes the UE device to enter a connected mode of operation. Mechanisms for establishing such as connection are well known in the field of wireless communication. In some embodiments, the UE device may establish the connection in a manner conforming to existing LTE specifications.

At 1715, in response to determining that said UE device is link budget limited, the UE device may enter a discontinuous reception (DRX) mode of operation while remaining in the connected mode of operation. This mode may be referred to as the C-DRX mode to distinguish it from the idle mode DRX.

The C-DRX mode uses a DRX cycle that repeats periodically, where the DRX cycle includes an ON duration and an OFF duration. The UE device is in a sleep mode in the OFF duration. In some embodiments, the C-DRX mode includes: (a) examining a downlink control channel occurring within the ON duration to determine if the downlink control channel includes resource assignment information for the UE device; and (b) in response to determining that the downlink control channel includes resource assignment information for the UE device, recovering payload information for the UE device from a downlink shared channel using the resource assignment information. In these embodiments, the UE device is designed so that it does not examine the downlink control channel in the OFF duration, and thus, saves the power and computational effort of decoding the downlink control channel.

In some embodiments, the method 1700 may also include receiving a DRX cycle value from the base station via RRC signaling, where the DRX cycle value determines the period of the DRX cycle. (RRC is an acronym for "Radio Resource Control"). The DRX cycle value may be changed by the base station based on an amount of traffic or an amount of network load experienced by the base station. (A larger DRX cycle value may be used when traffic or network load is low).

In some embodiments, the method 1700 may also include receiving a DRX cycle value from the base station via RRC signaling, where the DRX cycle value determines the period of the DRX cycle, where an initial DRX cycle value (upon initially entering the C-DRX mode) is equal to an idle-mode DRX cycle value (e.g., equal to 1.28 sec or 960 msec).

Figure 18:
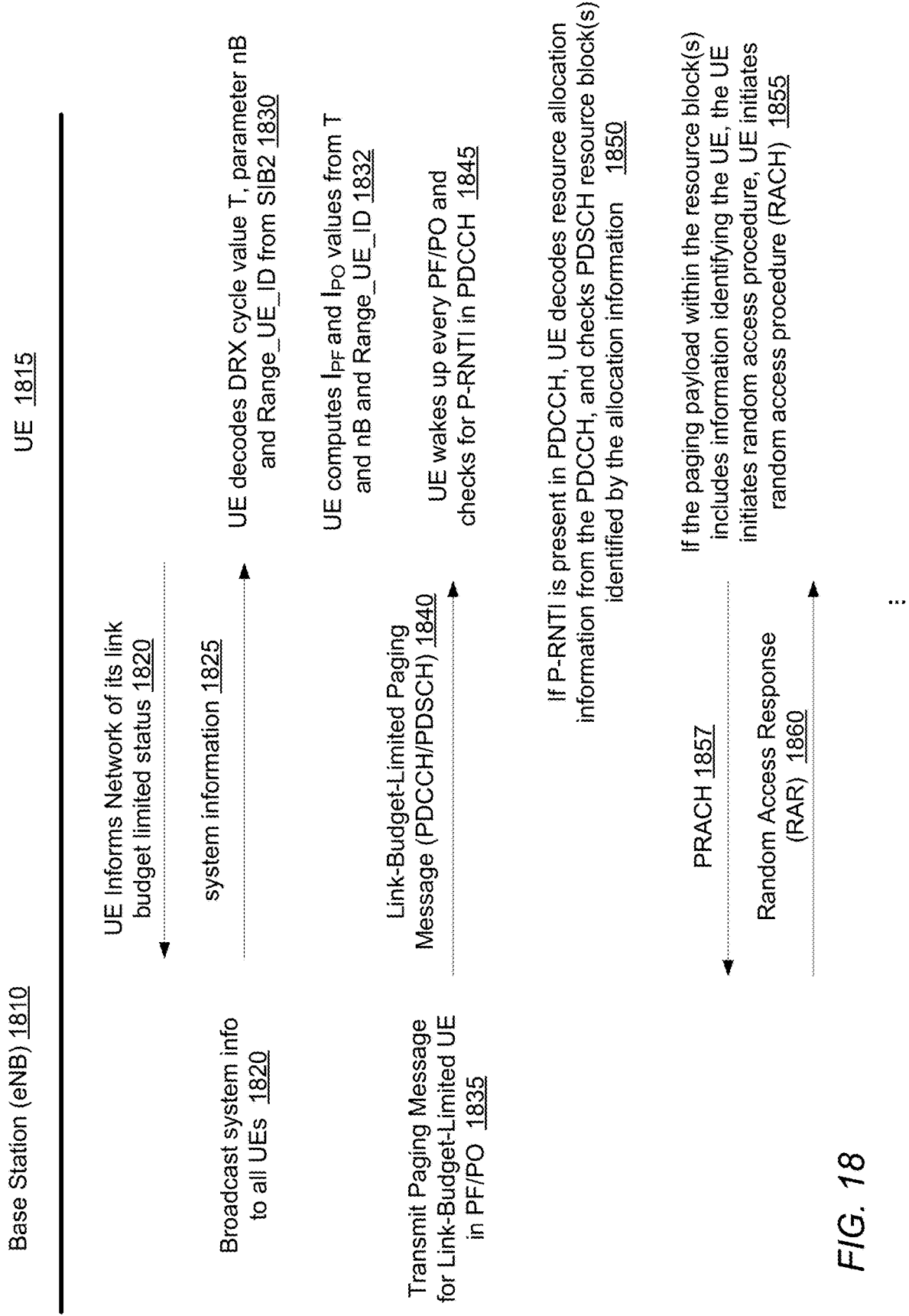
FIG. 18 illustrates a method for performing paging in a wireless communication system, according to some embodiments.

In one set of embodiments, a method 1800 for operating performing paging may include the operations shown in FIG. 18. (The method 1800 may also include any subset of the features, elements and embodiments described above).

At 1820, a user equipment (UE) 1815 may transmit a message to the base station 1810, informing the network that the UE is link budget limited. The UE may be link budget limited by design (e.g., by having been configured with a poorly performing antenna system), and/or, by circumstance (e.g., by being presently located in an area of poor cell coverage, far from the base station, or hidden from the base station by physical obstructions). The UE may be configured to automatically perform the transmission 1820, e.g., whenever it senses a new base station. Alternatively, the UE may be configured to perform the transmission 1820 when it determines that the quality of its received signal from the base station is poor (or weak). For example, the UE may measure signal strength (or any other measure of signal quality) of the received signal, and perform the transmission 1820 when the measured value falls below a predetermined threshold.

At 1820, the base station broadcasts system information 1825. The system information may include one or more system information blocks (SIBs). The base station may inject a DRX cycle value T, the parameter nB and the above-described Range_UE_ID in SIB2 (the system information block of Type 2).

At 1830, the UE decodes at least SIB2 from the system information.

At 1832, the UE may compute a paging frame identifier $I_{PF}$ and a paging occasion identifier $I_{PO}$ based on the DRX cycle T, the parameter nB and the Range_UE_ID.

At 1835, the base station transmits a paging message 1840 for the link-budget-limited UE. The paging message is included in a paging frame and paging occasion consistent with the previously transmitted values of DRX cycle T, parameter nB and Range_UE_ID.

At 1845, the UE wakes up for every subframe consistent with the computed paging frame identifier and computed paging occasion identifier, and checks the PDCCH of the subframe for the presence of P-RNTI.

At 1850, if the UE determines that P-RNTI is present in the PDCCH, the UE decodes resource allocation information from the PDCCH, and checks PDSCH resource block(s) identified by the allocation information, e.g., PDSCH resource blocks in the same subframe as the PDCCH.

At 1855, if the paging payload within the resource block(s) includes information (e.g., IMSI) uniquely identifying the UE, the UE may initiate a random access procedure to connect with the network. As is well known in the art of wireless communication, the random access procedure involves sending a physical random access channel (PRACH) 1857 to the base station, receiving a random access response 1860, and so forth. As a result of connecting to the network, the UE is able receive information (e.g., a voice call or a packet stream) that caused the paging message to be sent to the UE.

If the UE determines that the paging payload does not include information uniquely identifying the UE, the UE may return to idle mode until the next subframe consistent with the DRX cycle T, the computed paging frame identifier and the computed paging occasion identifier.

TTI Bundling for Paging in LTE
Payload Repetition in Subsequent Subframes

As described in the various embodiments above, in order to achieve successful decoding of paging for link-budget-limited UE device, the resources used by PDCCH and PDSCH may be increased. This increase in usage of PDCCH and PDSCH resources may cause the network (NW) capacity for paging to be reached, e.g., when multiple link budget limited devices are being paged simultaneously. In order to alleviate this impact, in one embodiment, the base station (e.g., the eNodeB) may perform paging transmissions as follows.

Figure 20A:
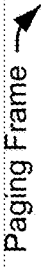
FIG. 20a illustrates a paging payload repetition scheme for the case Ns=1, according to some embodiments.
Figure 20A:

If Ns=1, then $I_{PO}$=9. (See the paging occasion table). In this case, the page load is initially transmitted in subframe $I_{PO}$=9 of the paging frame, and the page load is then repeated in a TTI bundling (TTI-B) fashion in sub-frames 0, 1, 2, . . . of the next frame following the paging frame, as shown in FIG. 20a, according to some embodiments. (Each of the repetitions is denoted $R_{i\_s'}$=0 to provide a reminder that it is a repetition of the initial transmission corresponding the paging occation $P_{i\_s'}$=0). The repetitions may occur in consecutive sub-frames. The number of repetitions may be determined by the performance of the UE and/or the load of the network (NW). The page load may contain the IMSIs of all the UEs that needed to be paged at the current time, i.e., normal devices that handle paging messages in a conventional fashion and link budget limited devices that handle paging messages as variously disclosed herein. (In some embodiments, a UE device may dynamically switch its page handling method between one of the presently-disclosed methods and a conventional method as its status changes between being link budget limited and not link budget limited. The conventional method may be satisfactory when the UE is not link budget limited).

Even if the normal devices have decoded their page indication from the initial transmission, the page load may remain the same in the repetitions (i.e., the subsequent transmissions). This will ensure that the link budget limited devices are able to soft combine over the multiple transmission instances (i.e, the initial transmission and the repetitions) of the page load.

If Ns=2, then $I_{PO}$ equals either 4 or 9. (See the paging occasion table). If $I_{PO}$=4, the page load is initially transmitted in subframe $I_{PO}$=4 of the paging frame, and repeated in sub-frames 5, 6, 7, 8 of the same paging frame, as shown in FIG. 20b, according to some embodiments. Each of these repetitions is denoted $R_{i\_s'}$=0 to provide a reminder that it is a repetition of the paging occasion $P_{i\_s'}$=0 at subframe 4. If $I_{PO}$=9, the page is initially transmitted in subframe $I_{PO}$=9 of the paging frame, and then repeated in sub-frames 0, 1, 2, 3 of the next frame following the paging frame, also shown in FIG. 20b, according to some embodiments. Each of these repetitions is denoted $R_{i\_s'}$=1.

Figure 20C:
FIG. 20c illustrates a paging payload repetition scheme for the case Ns=4, according to some embodiments.

If Ns=4, the paging occasion table would allow $I_{PO}$ values 0, 4, 5 and 9 corresponding respectively to the values 0, 1, 2 and 3 of variable i_s. (See the paging occasion table). However, to support paging-payload repetition for the link budget limited devices, the paging occasion identifier values 0 and 5 are more useful than the values 4 and 9. (The $I_{PO}$ values 0 and 5 each have three immediately following subframes that are not used for conventional paging. It is beneficial to have the payload repetitions follow in sub-frames immediately after the initial payload transmission). Thus, the base station and the link-budget-limited UE device may each access the paging occasion table with an index i_s' that taken from the set {0,2}, and thus, force the selection of either $I_{PO}$=0 or $I_{PO}$=5. If i_s'=0, then the page payload is initially transmitted in subframe $I_{PO}$=0 of the paging frame, and repeated in sub-frames 1, 2, 3, as shown in FIG. 20c, according to some embodiments. (The initial transmission is denoted $P_{i\_s'}$=0 and each repetition is denoted $T_{i\_s'}$=0). If i_s'=2, the page payload is initially transmitted in subframe $I_{PO}$=5, and repeated in sub-frames 6, 7, 8, also shown in FIG. 20c, according to some embodiments. (The initial transmission is denoted $P_{i\_s'}$=2 and each repetition is denoted $R_{i\_s'}$=2 The following formula may be used to compute the index i_s':

$$i\_s'=2\text{floor}(i\_s/2),$$

where i_s is the index computed according the 3GPP specification TS 36.304. The index i_s' will be used only by the link budget limited devices.

Alternative Mechanism Based on Modified Paging Occasion Table

Another proposal to cope with a high load of link budget limited devices is to change the Ns/i_s table (i.e., the paging occasion table). The modified table includes a new row containing the $I_{PO}$ values 1 and 6. This new row is dedicated for the paging of link budget limited devices, while the original rows may be used for normal devices (i.e., non link-budget-limited devices). The $I_{PO}$ value set {1,6} is advantageous because it is disjoint from the set of $I_{PO}$ values conventionally used for paging. (The conventionally used set is {0, 4, 5, 9}). Furthermore, within the set of $I_{PO}$ values not used for conventional paging, i.e., {1, 2, 3, 6, 7, 8}, the specific choices of 1 and 6 allow maximum space for subsequently following repetitions.

A link-budget-limited UE selects the $I_{PO}$ value from the set {1,6} based on the Range_UE_ID (or the conventional UE_ID, which is based on the IMSI of the UE) and the fixed value Ns'=2. (The link budget limited UE will not need to compute Ns, but simply use the fixed value Ns'=2). For example, the paging occasion value $I_{PO}$ may be selected based on the index i_s' given by:

$$i\_s'=(\text{Range\_UE\_ID}/N)\bmod Ns', \text{ or}$$

$$i\_s'=(UE\_ID/N)\bmod Ns'.$$

This will ensure that the link budget limited UEs are using different paging occasions than normal devices.

If i_s'=0, then the base station initially transmits the page in subframe $I_{PO}$=1 of the paging frame, and repeats the transmission in each of subsequent sub-frames 2 and 3, as shown in FIG. 21, according to some embodiments.

If i_s'=1, then the base station initially transmits the page in subframe $I_{PO}$=6 of the paging frame, and repeats the transmission in each of subsequent sub-frames 7 and 8, as shown in FIG. 21, according to some embodiments.

If, in addition, the paging frame identifier is computed based on the Range_UE_ID, then it will be possible to group the paging for the link budget limited UEs in a separate frame than normal UEs.

Figure 22:
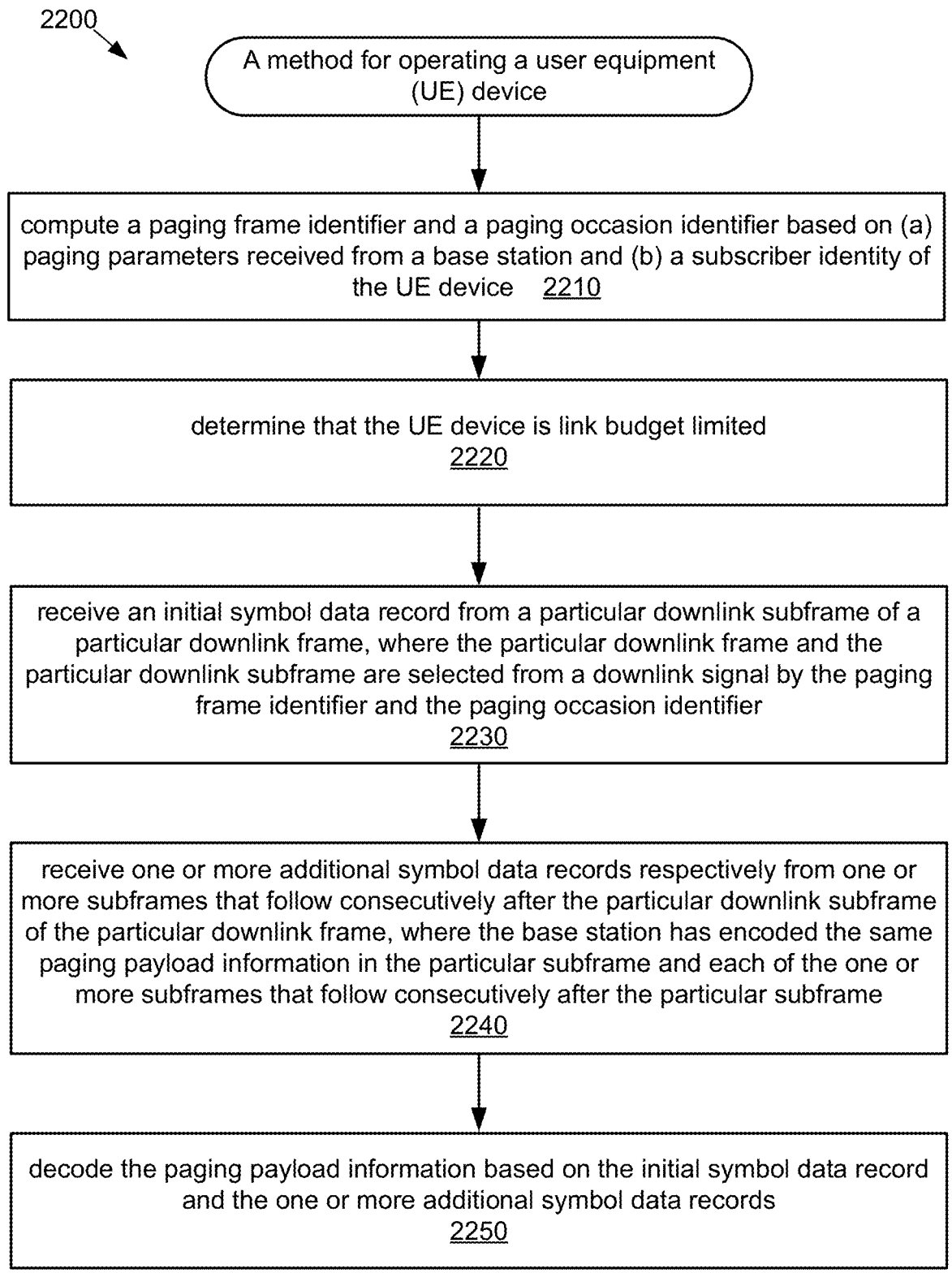
FIG. 22 illustrates a method for operating a user equipment to perform paging based on repeated transmission of paging payload information, according to some embodiments.

In one set of embodiments, a method 2200 for operating a user equipment (UE) device may be performed as shown in FIG. 22. (The method 2200 may also include any subset of the features, elements and embodiments described above). The method 2200 may be performed by (and especially beneficial for) a UE device that is link budget limited or a UE device that has become link budget limited. The method 2200 may be performed by a processing agent of the UE device, e.g., by one or more processors executing program instructions, by dedicated digital circuitry such as one or more ASICs, by programmable hardware such as one or more FPGAs, or by any combination of the foregoing.

At 2210, the UE may compute a paging frame identifier and a paging occasion identifier based on (a) paging parameters received from a base station and (b) a subscriber identity of the UE device.

In response to determining (at 2220) that the UE device is link budget limited, the UE may perform operations 2230 through 2250. It should be noted that the determining step 2220 may occur in a different order (relative to the other steps) than that depicted in FIG. 22. For example, the determining step may be performed immediately prior to the reception of the one or more additional symbol data sets, or perhaps before the computation step 2210.

At 2230, the UE may receive an initial symbol data set from a particular downlink subframe of a particular downlink frame, where the particular downlink frame and the particular downlink subframe are selected from a downlink signal based on the paging frame identifier and the paging occasion identifier. The particular downlink frame is constrained to be consistent with the paging frame identifier, and the particular downlink subframe is constrained to be consistent with the paging occasion identifier. As used herein, the term "symbol data set" is to be broadly interpreted as "a plurality of symbols".

At 2240, the UE may receive one or more additional symbol data sets respectively from one or more subframes that follow consecutively after the particular downlink subframe of the particular downlink frame, where the base station has encoded the same paging payload information in the particular subframe and each of the one or more subframes that follow consecutively after the particular subframe. At 2250, the UE may decode the paging payload information based on the initial symbol data set and the one or more additional symbol data sets. The one or more following subframes may occur in the particular downlink frame (if there is room within that frame) and/or in the next frame following immediately after the particular downlink frame.

In some embodiments, the action of decoding includes soft combining (or harq combining) the initial symbol data set and the one or more additional symbol data sets to form a combined symbol data set. The techniques of soft combining and harq combining are well understood in the field of signal processing.

In some embodiments, the action of computing the paging frame identifier and the paging occasion identifier is based on conventional formulas specified by an existing 3GPP standard (e.g., TS 36.304).

In some embodiments, the paging occasion identifier identifies a last subframe of the particular downlink frame, whereupon the one or more additional subframes occur in a frame immediately after the particular downlink frame.

In some embodiments, the paging occasion identifier identifies a subframe of the paging frame, i.e., a subframe whose subframe number is taken from the set $\{4, 9\}$.

In some embodiments, the paging occasion identifier is computed based on a formula that forces the paging occasion to be either 0 or 5.

In some embodiments, the formula is $$i\_s' = 2(\text{floor}(i\_s/2)),$$

where $i\_s$ is computed based on conventional formulas specified by an existing 3GPP standard (e.g., TS 36.304). The index $i\_s'$ may be used to select from an Ns=4 row of a paging occasion table as defined in the existing 3GPP standard.

In some embodiments, the base station has used the same encoding scheme to encode the paging payload information in the particular subframe and each of the one or more subframes that follow consecutively after the particular subframe.

In some embodiments, the method 2200 may also include initiating a random access procedure in response to determining that the paging payload information indicates that the user device is being paged (e.g., in response to determining that the paging payload information includes the IMSI of the UE device).

In one set of embodiments, a user equipment (UE) device may include: at least one antenna, at least one radio, and a processing agent. (The UE device may also include any subset of the features, elements and embodiments described above). The processing agent may be implemented by one or more processors executing program instructions, by dedicated digital circuitry such as one or more ASICs, by programmable hardware such as one or more FPGAs, or by any combination of the foregoing. The at least one radio may be configured to perform cellular communication using at least one radio access technology (RAT). The processing agent may be coupled to the at least one radio. The processing agent and the at least one radio are together configured to perform voice and/or data communications with base stations of a wireless network.

The processing agent may be configured to: compute a paging frame identifier and a paging occasion identifier based on (a) paging parameters received from a base station and (b) a subscriber identity of the UE device.

Furthermore, the processing agent may be configured to performing the following operations in response to determining that the UE device is link budget limited. (1) Receive an initial symbol data set from a particular downlink subframe of a particular downlink frame, where the particular downlink frame and the particular downlink subframe are selected from a downlink signal based on the paging frame identifier and the paging occasion identifier. (2) Receive one or more additional symbol data sets respectively from one or more subframes that follow consecutively after the particular downlink subframe of the particular downlink frame, where the base station has encoded the same paging payload information in the particular subframe and each of the one or more subframes that follow consecutively after the particular subframe. (3) Decode the paging payload information based on the initial symbol data set and the one or more additional symbol data sets.

In various embodiments described herein, a processing agent is referred to as a transmitting to a UE device and/or receiving from a UE device. It is to be understood that those actions of transmission and/or reception are performed by appropriately controlling at least one radio including a transmitter and/or a receiver.

In one set of embodiments, a base station may include at least one antenna, at least one radio, and a processing agent coupled to the at least one radio. (The base station may also include any subset of the features, elements and embodiments described above). The processing agent may be configured as variously described above. The at least one radio may be configured to perform cellular communication using at least one radio access technology (RAT). The processing agent and the at least one radio are together configured to perform voice and/or data communications with UE devices.

The processing agent may be configured to compute a paging frame identifier and a paging occasion identifier based on (a) paging parameters and (b) a subscriber identity of a user equipment (UE) device.

Furthermore, in response to determining (or being informed) that the UE device is link budget limited, the processing agent may be configured to perform the following operations. (A) Transmit paging payload information in a particular downlink subframe of a particular downlink frame, where the particular downlink frame and the particular downlink subframe are selected from a frame sequence based on the paging frame identifier and the paging occasion identifier. (B) Transmit the same paging payload information in each of the one or more subframes that follow consecutively after the particular subframe.

In some embodiments, the action of computing the paging frame identifier and the paging occasion identifier is based on conventional formulas specified by an existing 3 GPP standard (e.g., TS 36.304).

In some embodiments, the paging occasion identifier identifies a last subframe of the particular downlink frame, whereupon the one or more additional subframes occur in a frame immediately after the particular downlink frame.

In some embodiments, the paging occasion identifier identifies a subframe of the paging frame, i.e., a subframe whose subframe number is selected from the set {4, 9}.

In some embodiments, the paging occasion identifier is computed based on a formula that forces the paging occasion to be either 0 or 5. For example, the formula may be given by the expression:

$$i\_s'=2(\text{floor}(i\_s/2)),$$

where i_s is computed based on conventional formulas specified by an existing 3GPP standard (e.g., TS 36.304). The index i_s' may be used to select from an Ns=4 row (i.e., the row corresponding to Ns=4) of a paging occasion table as defined in the existing 3GPP standard.

In some embodiments, the base station uses the same encoding scheme to encode the paging payload information in the particular subframe and each of the one or more subframe that follow consecutively after the particular subframe.

Figure 23:
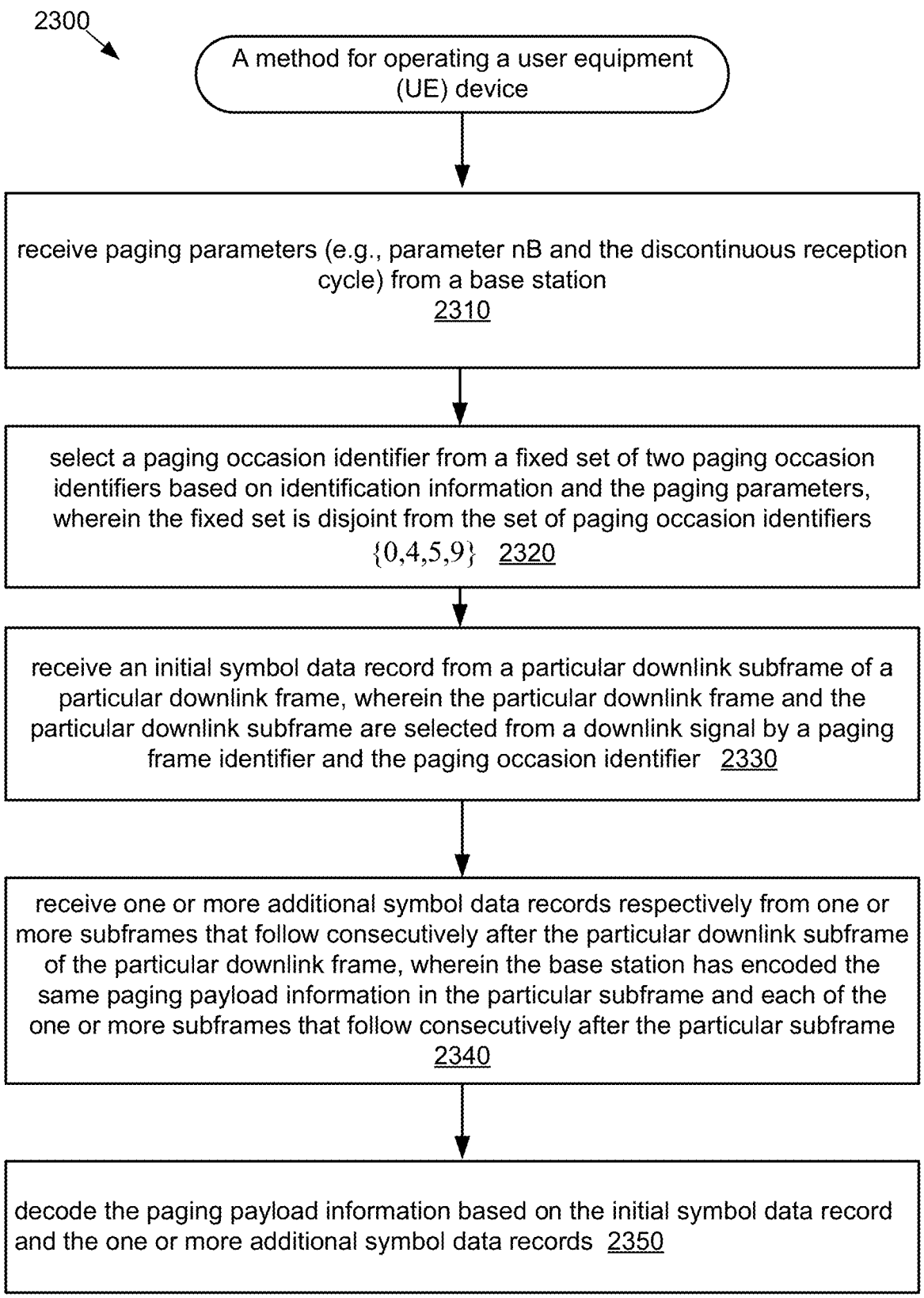
FIG. 23 illustrates a method for operating a user equipment device based on newly-defined paging occasion identifiers and repeated transmissions of paging payload information, according to some embodiments.

In one set of embodiments, a method 2300 for operating a user equipment (UE) device that is link budget limited may be preformed as shown in FIG. 23. (The method 2300 may also include any subset of the features, elements and embodiments described above). The method 2200 may be performed by a processing agent of the UE device, e.g., by one or more processors executing program instructions, by dedicated digital circuitry such as one or more ASICs, by programmable hardware such as one or more FPGAs, or by any combination of the foregoing.

At 2310, the UE device may receive paging parameters (e.g., parameter nB and the discontinuous reception cycle) from the base station.

At 2320, the UE device may select a paging occasion identifier from a fixed set of two paging occasion identifiers (or more generally, $N_{FS}>1$) based on identification information and the paging parameters. The fixed set is disjoint from the set of paging occasion identifiers {0, 4, 5, 9} conventionally used for paging in LTE.

In some embodiments, the identification information is a class identifier dedicated for use by UE devices that are link budget limited, where the identification information is received from the base station (e.g., as part of a broadcast of system information). In other embodiments, the identification information is determined from the IMSI of the UE device, e.g., as variously described above.

At 2330, the UE device may receive an initial symbol data set from a particular downlink subframe of a particular downlink frame, where the particular downlink frame and the particular downlink subframe are selected from a downlink signal based on a paging frame identifier and the paging occasion identifier. (The downlink signal is transmitted by the base station, and includes a temporal succession of radio frames, with each radio frame including a plurality of subframes).

At 2340, the UE device may receive one or more additional symbol data sets respectively from one or more subframes that follow consecutively after the particular downlink subframe of the particular downlink frame. The same paging payload information is encoded in the particular subframe and each of the one or more subframes that follow consecutively after the particular subframe.

At 2350, the UE device may decode the paging payload information based on the initial symbol data set and the one or more additional symbol data sets.

In some embodiments, the fixed set of available paging occasion identifiers is the set {1, 6}.

In some embodiments, the action of selecting the paging occasion identifier includes: computing a selection index i_s' based on the expression $$i\_s'=((\text{identification information})/N)\bmod Ns',$$

where Ns'=2, where N is determined based on the paging parameters; and selecting the paging occasion identifier from the fixed set based on the value of the selection index i_s'.

In some embodiments, the paging frame identifier is computed based on the identification information.

In one set of embodiments, a user equipment (UE) device may include at least one antenna, at least one radio, and a processing agent coupled to the at least one radio. (The UE device may also include any subset of the features, elements and embodiments described above). The processing agent may be configured as variously described above. The at least one radio may be configured to perform cellular communication using at least one radio access technology (RAT). The processing agent and the at least one radio are together configured to perform voice and/or data communications with base stations of a wireless network.

The processing agent may be configured to receive paging parameters (e.g., parameter nB and the discontinuous reception cycle) from a base station.

Furthermore, the processing agent may be configured to perform the following operations. (1) Select a paging occasion identifier from a fixed set of two paging occasion identifiers based on identification information and the paging parameters, where the fixed set is disjoint from the set of paging occasion identifiers {0, 4, 5, 9} conventionally used for paging in LTE. (2) Receive an initial symbol data set from a particular downlink subframe of a particular downlink frame, where the particular downlink frame and the particular downlink subframe are selected from a downlink signal based on a paging frame identifier and the paging occasion identifier. (3) Receive one or more additional symbol data sets respectively from one or more subframes that follow consecutively after the particular downlink subframe of the particular downlink frame, where the base station has encoded the same paging payload information in the particular subframe and each of the one or more subframes that follow consecutively after the particular subframe. (4) Decode the paging payload information based on the initial symbol data set and the one or more additional symbol data sets.

In one set of embodiments, a base station may include at least one antenna, at least one radio, and a processing agent coupled to the at least one radio. (The base station may also include any subset of the features, elements and embodiments described above). The processing agent may be configured as variously described above. The at least one radio may be configured to perform cellular communication using at least one radio access technology (RAT). The processing agent and the at least one radio may be configured to perform voice and/or data communications with UE devices.

The processing agent may be configured to transmit paging parameters (e.g., parameter nB and the discontinuous reception cycle) to a user equipment device.

When the UE device is link budget limited, the processing agent may be configured to perform the following operations. (1) Select a paging occasion identifier from a fixed set of two paging occasion identifiers based on identification information and the paging parameters, where the fixed set is disjoint from the set of paging occasion identifiers {0, 4, 5, 9} conventionally used for paging in LTE. (2) Transmit paging payload information in a particular downlink subframe of a particular downlink frame, where the particular downlink frame and the particular downlink subframe are selected from a frame sequence based on a paging frame identifier and the paging occasion identifier. (3) Transmit the same paging payload information in each of the one or more subframes that follow consecutively after the particular subframe.

In some embodiments, the identification information is a class identifier dedicated for use by UE devices that are link budget limited, whereupon the identification information is transmitted by the base station (e.g., as part of system information broadcast).

In some embodiments, the identification information is determined from the IMSI of the UE device, e.g., an IMSI stored in the UE device.

In some embodiments, the fixed set of available paging occasion identifiers is the set {1,6}.

In some embodiments, the action of selecting the paging occasion identifiers includes: computing a selection index i_s' based on the expression $$i\_s'=((\text{identification information})/N) \bmod Ns',$$

where Ns'=2, where N is determined based on the paging parameters; and selecting the paging occasion identifier from the fixed set based on the value of the selection index i_s'.

In some embodiments, the paging frame identifier is computed based on the identification information.

Various additional embodiments are described in the following paragraphs.

In one set of embodiments, a method for providing improved paging performance in a cellular communication system may be performed by a base station. The method may include the following operations.

The base station may receive a mobile terminating call intended for a user equipment (UE) device.

The base station may transmit paging control information to the UE in a paging control channel, wherein the paging control channel comprises two, three or four OFDM (Orthogonal Frequency-Division Multiplexing) symbols and an aggregation level in the range from 9 to 32.

The base station may transmit paging payload data to the UE device in a paging data channel. The paging control information in the paging control channel specifies a location of the paging payload data in the paging data channel, wherein the paging control information is useable by the UE to locate the paging payload data.

The paging control channel may be a physical downlink control channel (PDCCH) having format 1C.

The paging control information may be encoded prior to inclusion in the paging control channel, wherein the paging control information is encoded with lower coding rate than specified in existing 3GPP standards.

In some embodiments, the paging control channel is a physical downlink control channel (PDCCH); and the paging data channel is a physical downlink shared channel (PDSCH).

The paging control information may occupy a number of resource blocks that is in the range from $n_{LOWER}$ to $n_{UPPER}$, wherein $n_{LOWER}$ is a value in the range {12, 13, 14, 15, 16}, wherein $n_{UPPER}$ is a value in the range from 22 to 48.

The number of resource blocks occupied by the paging control information may depend on the aggregation level.

The paging payload data may occupy a number of resource blocks that is in the range from $n_{LOWER}$ to $n_{UPPER}$, wherein $n_{LOWER}$ is a value in the range {12, 13, 14, 15, 16}, wherein $n_{UPPER}$ is a value in the range from 22 to 48.

The paging payload data may be less than or equal to 40 bits in length, e.g., when a transport block size used to transmit the paging payload data is equal to 40 bits.

In some embodiments, the UE device may support only LTE. In these embodiments, the paging payload data may include an international mobile subscriber identity (IMSI) of the UE, but does not include an indicator for selection between packet-switched data transfer and circuit-switched data transfer.

In one set of embodiments, a method for providing improved paging performance in a cellular communication system may be performed by a user equipment (UE) device and include the following operations.

The UE device may receive a paging control channel and a paging data channel from a base station.

In response to determining that the paging control channel contains a paging-specific temporary identity, the UE device may read paging control information from the paging control channel, wherein the paging control channel comprises two, three or four OFDM (orthogonal frequency division multiplexing) symbols and has an aggregation level in the range from 9 to 32, wherein the paging control information in the paging control channel specifies a location of paging payload data in the paging data channel.

The UE device may determine the location of the paging payload data in the paging data channel based on the paging control information.

In response to a determination that the paging payload data contains information identifying the UE device, the UE device may perform a random access procedure to connect to a network through the base station.

In some embodiments, the paging control channel may be a physical downlink control channel (PDCCH) having format 1C.

In some embodiments, the paging control channel is a physical downlink control channel (PDCCH), and the paging data channel is a physical downlink shared channel (PDSCH).

In some embodiments, the paging control information may occupy a number of resource blocks that is in the range from $n_{LOWER}$ to $n_{UPPER}$, wherein $n_{LOWER}$ is a value in the range $\{12, 13, 14, 15, 16\}$, wherein $n_{UPPER}$ is a value in the range from 22 to 48.

In some embodiments, the number of resource blocks occupied by the paging control information may depend on the aggregation level.

In some embodiments, the paging payload data may occupy a number of resource blocks that is in the range from $n_{LOWER}$ to $n_{UPPER}$, wherein $n_{LOWER}$ is a value in the range $\{12, 13, 14, 15, 16\}$, wherein $n_{UPPER}$ is a value in the range from 22 to 48.

In some embodiments, the paging payload data may be less than or equal to 40 bits in length, e.g., when a transport block size used to transmit the paging payload data is equal to 40 bits.

In some embodiments, the UE device may also receiving a mobile terminating call after having connected to the network.

In one set of embodiments, a base station may be configured to perform wireless communication with a wireless device. The base station may comprise a radio, and a processing agent operatively coupled to the radio. The processing agent may be configured to perform the following operations. (1) Receive a mobile terminating call intended for a user equipment (UE) device. (2) Transmit paging control information to the UE in a paging control channel, wherein the paging control channel comprises two, three or four OFDM (orthogonal frequency-division multiplexing) symbols and an aggregation level in the range from 9 to 32. (3) Transmit paging payload data to the UE device in a paging data channel.

The paging control information in the paging control channel may specify a location of the paging payload data in the paging data channel, wherein the paging control information is useable by the UE device to locate the paging payload data.

In one set of embodiments, a method for operating a user equipment (UE) device may include the following operations.

The UE device may receive system information from a base station, wherein the system information includes identification information, a discontinuous reception (DRX) cycle and a parameter nB.

In response to determining that the UE device is link budget limited, the UE device may compute a paging frame identifier using the identification information, the DRX cycle and the parameter nB.

The UE device may perform discontinuous reception using the computed paging frame identifier.

The identification information may be dedicated for use by UE devices that are link budget limited, i.e., used only in connection with the paging of link-budget-limited UE devices.

In one set of embodiments, a method for operating a user equipment (UE) device may include the following operations.

The UE device may receive system information from a base station, wherein the system information includes identification information, a discontinuous reception (DRX) cycle and a parameter nB, wherein the identification information is dedicated for use by UE devices that are link budget limited.

In response to determining that the UE device is link budget limited, the UE device may compute a paging frame identifier using the identification information, the DRX cycle and the parameter nB.

In a discontinuous reception mode of operation, the UE device may: wake from sleep at a particular subframe of a particular downlink frame transmitted by the base station, wherein the particular downlink frame and particular subframe are determined respectively by the paging frame identifier and a paging occasion identifier; and determine if the particular subframe includes paging payload information targeted for the UE device.

In response to determining that the particular subframe includes paging payload information targeted for the UE device, the UE device may invoke a random access procedure to establish a connection between the UE device and the base station.

In some embodiments, in response to said determining that the UE device is link budget limited, the UE device may also determine the paging occasion identifier based on a subscriber identity of the UE device, the DRX cycle and the parameter nB.

In some embodiments, the action of determining the paging occasion identifier may include: (a) computing a parameter Ns based on the DRX cycle and the parameter nB, wherein the parameter Ns represents a number of available paging occasions; (b) computing an index i_s based on the subscriber identity of the UE device, the DRX cycle and the parameter nB, wherein the index i_s indicates one of the available paging occasions; and (c) accessing an identifier value for said one of the available paging occasions from a table using the parameter Ns and index i_s.

In some embodiments, in response to said determining that the UE device is link budget limited, the UE device may determine the paging occasion identifier based on the identification information, the DRX cycle and the parameter nB.

In some embodiments, the action of determining the paging occasion identifier includes: (a) computing a parameter Ns based on the DRX cycle and the parameter nB, wherein the parameter Ns represents a number of available paging occasions; (b) computing an index i_s based on the identification information, the DRX cycle and the parameter nB, wherein the index i_s indicates one of the available paging occasions; and (c) accessing an identifier value for said one of the available paging occasions from a table using on the parameter Ns and index i_s.

In response to said determining that the UE device is link budget limited, the UE device may in some embodiments determine the paging occasion identifier by: (1) computing an index i_s based on a fixed value of parameter Ns, a subscriber identity of the UE device, the DRX cycle and the parameter nB, wherein the fixed value is used by UE devices that are link budget limited, wherein the index i_s indicates a paging occasion identifier value from a fixed set of available paging occasion identifier values, wherein the fixed set of available paging occasion identifier values is disjoint from a conventional set of paging occasion identifier values used by UE devices that are not link budget limited; and (2) accessing said paging occasion identifier value from a table including at least the fixed set of available paging occasion identifier values using the index i_s.

In some embodiments, the fixed value of parameter Ns is not a member of the set $\{1, 2, 4\}$.

In some embodiments, the conventional set of paging occasion identifier values is defined by the set of subframe indices {0, 4, 5, 9}.

In some embodiments, the fixed set of available paging occasion identifier values is defined by the set of subframe indices {1, 2, 3, 6, 7, 8}.

In some embodiments, a number Ns of the available paging occasion identifier values in said fixed set is greater than or equal to six. The index i_s may be computed based in part on the number Ns.

In one set of embodiments, a method for operating a user equipment (UE) device may include the following operations.

The UE device may receive system information from a base station, wherein the system information includes a plurality of identifiers, a discontinuous reception (DRX) cycle and a parameter nB.

In response to determining that the UE device is link budget limited, the UE device may: (a) determine a user-specific ID from a subscriber identity of the UE device, (b) select one of the plurality of identifiers based on the user-specific ID, and (c) compute a paging frame identifier using the selected identifier, the DRX cycle and the parameter nB.

The UE device may perform discontinuous reception using the computed paging frame identifier and the DRX cycle.

The identifiers may be dedicated for use by UE devices that are link budget limited.

In one set of embodiments, a method for operating a user equipment (UE) device may include the following operations.

The UE device may receive system information from a base station, wherein the system information includes a plurality of identifiers, a discontinuous reception (DRX) cycle and a parameter nB, wherein the identifiers are dedicated for use by UE devices that are link budget limited.

In response to determining that said UE device is link budget limited, the UE device may: determine a user-specific ID from a subscriber identity of the UE device; select one of the plurality of identifiers based on the user-specific ID; and compute a paging frame identifier using the selected identifier, the DRX cycle and the parameter nB.

In a discontinuous reception mode of operation, the UE device may: wake from sleep at a particular subframe of a particular downlink frame transmitted by the base station, wherein the particular downlink frame and particular subframe are determined respectively by the paging frame identifier and a paging occasion identifier; and determine if the particular subframe includes paging payload information targeted for the UE device.

In response to determining that the particular subframe includes paging payload information targeted for the UE device, the UE device may invoke a random access procedure to establish a connection between the UE device and the base station.

In some embodiments, the action of selecting one of the plurality of identifiers may include: determining which of a plurality of disjoint ranges the user-specific ID occurs within, wherein each of the ranges is associated with a respective one of the identifiers; and selecting the identifier that corresponds to the determined range.

In one set of embodiments, a method for operating a user equipment (UE) device may include the following operations.

The UE device may receive system information from a base station, wherein the system information includes at least a discontinuous reception (DRX) cycle and a parameter nB.

In response to determining that the UE device is link budget limited, the UE device may: (a) determine a UE identifier based on a subscriber identity of the UE device; (b) compute an index value i_s using a fixed value of parameter Ns, the discontinuous reception (DRX) cycle, the parameter nB and the UE identifier; and (c) select a paging occasion identifier from a fixed set of available paging occasion identifiers based on the index value i_s, wherein the fixed set of available paging occasion identifiers is disjoint from a conventional set of paging occasion identifiers used by UE devices that are not link budget limited.

The UE device may perform discontinuous reception using a paging frame identifier, the DRX cycle and the computed paging occasion identifier.

In some embodiments, the fixed value of the parameter Ns is used by UE devices that are link budget limited.

In one set of embodiments, a method for operating a user equipment (UE) device may include the following operations.

The UE device may receive system information from a base station, wherein the system information includes at least a discontinuous reception (DRX) cycle and a parameter nB.

In response to determining that the UE device is link budget limited, the UE device may: (a) determine a UE identifier based on a subscriber identity of the UE device; (b) compute an index value i_s using a fixed value of parameter Ns, the discontinuous reception (DRX) cycle, the parameter nB and the UE identifier, wherein the fixed value of the parameter Ns is used by UE devices that are link budget limited; and (c) select a paging occasion identifier from a fixed set of available paging occasion identifiers based on the index value i_s, wherein the fixed set of available paging occasion identifiers is disjoint from a conventional set of paging occasion identifiers used by UE devices that are not link budget limited.

In a discontinuous reception mode of operation, the UE device may: wake from sleep at a particular subframe of a particular downlink frame transmitted by the base station, wherein the particular downlink frame and particular subframe are identified respectively by a paging frame identifier and the paging occasion identifier; and determine if the particular subframe includes paging payload information targeted for the UE device.

In response to determining that the particular subframe includes paging payload information targeted for the UE device, the UE device may invoke a random access procedure to establish a connection between the UE device and the base station.

In some embodiments, the fixed value of Ns is not a member of the set {1, 2, 4}.

In some embodiments, the conventional set of paging occasion identifiers is specified by the set of subframe indices {0, 4, 5, 9}.

In some embodiments, the system information also includes identification information dedicated for use by UEs that are link budget limited. In these embodiments, the paging frame identifier may be determined based on the identification information, the discontinuous reception (DRX) cycle and the parameter nB.

In some embodiments, the paging frame (PO) may be determined based on a subscriber identity of the UE device, the discontinuous reception (DRX) cycle and the parameter nB.

In one set of embodiments, a method for operating a user equipment (UE) device may include the following operations.

The UE device may establish a connection with a network through a base station, wherein said establishing causes the UE device to enter a connected mode of operation.

In response to determining that the UE device is link budget limited, the UE device may enter a discontinuous reception (DRX) mode of operation while remaining in the connected mode of operation.

In some embodiments, the DRX mode uses a DRX cycle that repeats periodically, where the DRX cycle includes an ON duration and an OFF duration, and where the UE device is in a sleep mode in the OFF duration. In these embodiment, the DRX mode may include: (a) examining a downlink control channel occurring within the ON duration to determine if the downlink control channel includes resource assignment information for the UE device; and (b) in response to determining that the downlink control channel includes resource assignment information for the UE device, recovering payload information for the UE device from a downlink shared channel using the resource assignment information.

In some embodiments, the UE device does not examine the downlink control channel in the OFF duration.

In some embodiments, the UE device may also receive a DRX cycle value from the base station via RRC signaling, wherein the DRX cycle value determines the period of the DRX cycle. The DRX cycle value may be changed by the base station based on an amount of traffic or an amount of network load.

In some embodiments, the UE device may also receive a DRX cycle value from the base station via RRC signaling, wherein the DRX cycle value determines the period of the DRX cycle. The initial DRX cycle value may be equal to an idle mode DRX cycle.

In one set of embodiments, a method for operating a user equipment (UE) device may include the following operations.

The UE device may compute a paging frame identifier and a paging occasion identifier based on (a) paging parameters received from a base station and (b) a subscriber identity of the UE device.

In response to determining that the UE device is link budget limited, the UE device may: (a) receive an initial symbol data set from a particular downlink subframe of a particular downlink frame, wherein the particular downlink frame and the particular downlink subframe are selected from a downlink signal based on the paging frame identifier and the paging occasion identifier; (b) receive one or more additional symbol data sets respectively from one or more subframes that follow consecutively after the particular downlink subframe of the particular downlink frame, wherein the base station has encoded the same paging payload information in the particular subframe and each of the one or more subframes that follow consecutively after the particular subframe; and (c) decode the paging payload information based on the initial symbol data set and the one or more additional symbol data sets.

In some embodiments, the action of decoding includes soft combining the initial symbol data set and the one or more additional symbol data sets to form a combined symbol data set.

In some embodiments, the action of computing the paging frame identifier and the paging occasion identifier is based on conventional formulas specified by an existing 3GPP standard.

In some embodiments, the paging occasion identifier identifies a last subframe of the particular downlink frame, whereupon the one or more additional subframes may occur in a frame immediately after the particular downlink frame.

In some embodiments, the paging occasion identifier identifies a subframe of the paging frame from the set $\{4, 9\}$.

In some embodiments, the paging occasion identifier is computed based on a formula that forces the paging occasion to be either 0 or 5.

In some embodiments, the formula is $$i\_s' = 2(\mathrm{floor}(i\_s/2)),$$

wherein i_s is computed based on conventional formulas specified by an existing 3GPP standard. The index i_s' may be used to select from an Ns=4 row of a paging occasion table as defined in the existing 3GPP standard.

In some embodiments, the base station has used the same encoding scheme to encode the paging payload information in the particular subframe and each of the one or more subframe that follow consecutively after the particular subframe.

In some embodiments, the UE device may also initiate a random access procedure in response to determining that the paging payload information indicates that the user device is being paged.

In one set of embodiment, a user equipment (UE) device may be configured as follows. The UE device may include at least one radio and a processing agent. The at least one radio may be configured to perform cellular communication using at least one radio access technology (RAT). The processing agent may be coupled to the at least one radio, and configured to perform the following operations. (1) Compute a paging frame identifier and a paging occasion identifier based on (a) paging parameters received from a base station and (b) a subscriber identity of the UE device. (2) In response to determining that the UE device is link budget limited, (c) receive an initial symbol data set from a particular downlink subframe of a particular downlink frame, wherein the particular downlink frame and the particular downlink subframe are selected from a downlink signal based on the paging frame identifier and the paging occasion identifier; (d) receive one or more additional symbol data sets respectively from one or more subframes that follow consecutively after the particular downlink subframe of the particular downlink frame, wherein the base station has encoded the same paging payload information in the particular subframe and each of the one or more subframes that follow consecutively after the particular subframe; and (e) decode the paging payload information based on the initial symbol data set and the one or more additional symbol data sets.

In some embodiments, said decoding includes soft combining the initial symbol data set and the one or more additional symbol data sets to form a combined symbol data set.

In some embodiments, said computing the paging frame identifier and the paging occasion identifier is based on conventional formulas specified by an existing 3GPP standard.

In some embodiments, the paging occasion identifier identifies a last subframe of the particular downlink frame, wherein the one or more additional subframes occur in a frame immediately after the particular downlink frame.

In some embodiments, the paging occasion identifier identifies a subframe of the paging frame from the set {4, 9}.

In some embodiments, the paging occasion identifier is computed based on a formula that forces the paging occasion to be either 0 or 5.

In some embodiments, the formula is given by:

$$i\_s'=2(\text{floor}(i\_s/2)),$$

wherein i_s is computed based on conventional formulas specified by an existing 3GPP standard. The index i_s' is used to select from an Ns=4 row of a paging occasion table as defined in the existing 3GPP standard.

In some embodiments, the base station has used the same encoding scheme to encode the paging payload information in the particular subframe and each of the one or more subframe that follow consecutively after the particular subframe.

In one set of embodiments, a base station may be configured as follows. The base station may include at least one radio and a processing agent. The at least one radio is configured to perform cellular communication using at least one radio access technology (RAT). The processing agent may be coupled to the at least one radio, and configured to perform the following operations. (1) Compute a paging frame identifier and a paging occasion identifier based on (a) paging parameters and (b) a subscriber identity of a user equipment (UE) device. In response to determining that the UE device is link budget limited: (2) transmit paging payload information in a particular downlink subframe of a particular downlink frame, wherein the particular downlink frame and the particular downlink subframe are selected from a frame sequence based on the paging frame identifier and the paging occasion identifier; and (4) transmit the same paging payload information in each of the one or more subframes that follow consecutively after the particular subframe.

In some embodiments, said computing the paging frame identifier and the paging occasion identifier is based on conventional formulas specified by an existing 3GPP standard.

In some embodiments, the paging occasion identifier identifies a last subframe of the particular downlink frame, whereupon the one or more additional subframes occur in a frame immediately after the particular downlink frame.

In some embodiments, the paging occasion identifier identifies a subframe from the set {4, 9}.

In some embodiments, the paging occasion identifier is computed based on a formula that forces the paging occasion to be either 0 or 5.

In some embodiments, the formula is given by:

$$i\_s'(\text{newdevice})=2(\text{floor}(i\_s/2)),$$

wherein i_s is computed based on conventional formulas specified by an existing 3GPP standard. The index i_s' is used to select from an Ns=4 row of a paging occasion table as defined in the existing 3GPP standard.

In some embodiments, the base station uses the same encoding scheme to encode the paging payload information in the particular subframe and each of the one or more subframe that follow consecutively after the particular subframe.

In one set of embodiments, a method for operating a user equipment (UE) device that is link budget limited may include the following operations.

The UE device may receive paging parameters from the base station.

The UE device may select a paging occasion identifier from a fixed set of two paging occasion identifiers based on identification information and the paging parameters, wherein the fixed set is disjoint from the set of paging occasion identifiers {0, 4, 5, 9}.

The UE device may receive an initial symbol data set from a particular downlink subframe of a particular downlink frame, wherein the particular downlink frame and the particular downlink subframe are selected from a downlink signal based on a paging frame identifier and the paging occasion identifier.

The UE device may receive one or more additional symbol data sets respectively from one or more subframes that follow consecutively after the particular downlink subframe of the particular downlink frame, wherein the same paging payload information is encoded in the particular subframe and each of the one or more subframes that follow consecutively after the particular subframe.

The UE device may decode the paging payload information based on the initial symbol data set and the one or more additional symbol data sets.

In some embodiments, the identification information is a class identifier dedicated for use by UE devices that are link budget limited. The identification information may be received from the base station.

In some embodiments, the identification information is determined from the IMSI of the UE device.

In some embodiments, the fixed set of available paging occasion identifiers is the set {1,6}.

In some embodiments, said selecting the paging occasion identifier includes: computing a selection index i_s' based on the expression $$i\_s'=((\text{identification information})/N)\bmod Ns',$$

wherein Ns'=2, wherein N is determined based on the paging parameters; and selecting the paging occasion identifier from the fixed set based on the value of the selection index i_s'.

In some embodiments, the paging frame identifier is computed based on the identification information.

In one set of embodiments, a user equipment (UE) device may be configured as follows. The UE device may include at least one radio and a processing agent.

The at least one radio is configured to perform cellular communication using at least one radio access technology (RAT).

The processing agent may be coupled to the at least one radio, and configured to perform the following operations. (1) Receive paging parameters from the base station. (2) Select a paging occasion identifier from a fixed set of two paging occasion identifiers based on identification information and the paging parameters, wherein the fixed set is disjoint from the set of paging occasion identifiers {0, 4, 5, 9}. (3) Receive an initial symbol data set from a particular downlink subframe of a particular downlink frame, wherein the particular downlink frame and the particular downlink subframe are selected from a downlink signal based on a paging frame identifier and the paging occasion identifier. (4) Receive one or more additional symbol data sets respectively from one or more subframes that follow consecutively after the particular downlink subframe of the particular downlink frame, wherein the base station has encoded the same paging payload information in the particular subframe and each of the one or more subframes that follow consecutively after the particular subframe. (5) Decode the paging payload information based on the initial symbol data set and the one or more additional symbol data sets.

In one set of embodiments, the identification information is a class identifier dedicated for use by UE devices that are link budget limited, wherein the identification information is received from the base station.

In some embodiments, the identification information is determined from the IMSI of the UE device.

In some embodiments, the fixed set of available paging occasion identifiers is the set {1,6}.

In some embodiments, said selecting the paging occasion identifier includes: computing a selection index i_s' based on the expression $$i\_s'=((\text{Identification Information})/N)\text{Mod } Ns',$$

wherein Ns'=2, wherein N is determined based on the paging parameters; and selecting the paging occasion identifier from the fixed set based on the value of the selection index i_s'.

In some embodiments, the paging frame identifier is computed based on the identification information.

In one set of embodiments, a base station may be configured as follows.

The base station may include at least one radio and a processing agent.

The at least one radio is configured to perform cellular communication using at least one radio access technology (RAT).

The processing agent may be coupled to the at least one radio, and configured to perform the following operations. (1) Transmit paging parameters to a user equipment (UE). When the UE device is link budget limited, (2) select a paging occasion identifier from a fixed set of two paging occasion identifiers based on identification information and the paging parameters, wherein the fixed set is disjoint from the set of paging occasion identifiers {0, 4, 5, 9}, (3) transmit paging payload information in a particular downlink subframe of a particular downlink frame, wherein the particular downlink frame and the particular downlink subframe are selected from a frame sequence based on a paging frame identifier and the paging occasion identifier, and (4) transmit the same paging payload information in each of the one or more subframes that follow consecutively after the particular subframe.

In some embodiments, the identification information is a class identifier dedicated for use by UE devices that are link budget limited, wherein the identification information is transmitted by the base station.

In some embodiments, the identification information is determined from the IMSI of the UE device.

In some embodiments, the fixed set of available paging occasion identifiers is the set {1,6}.

In some embodiments, said selecting the paging occasion identifier includes: computing a selection index i_s' based on the expression $$i\_s'=((\text{identification information})/N)\text{mod } Ns',$$

wherein Ns'=2, wherein N is determined based on the paging parameters; and selecting the paging occasion identifier from the fixed set based on the value of the selection index i_s'.

In some embodiments, the paging frame identifier is computed based on the identification information.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one radio, wherein the at least one radio is configured to perform orthogonal frequency-division multiplexing (OFDM) cellular communication using at least one radio access technology (RAT); and
   a processor coupled to the at least one radio, and configured to:
   determine that the UE is link budget limited based on signal strength;
   in response to determining that the UE is link budget limited:
   inform a network via a base station that the UE is link budget limited;
   determine a UE identifier based on a subscriber identity of the UE;
   determine a paging frame based on the UE identifier; and
   determine a paging occasion using a first value for a numerical parameter Ns used by UEs that are link budget limited, wherein Ns defines a number of available paging occasion identifier values;
   wherein the first value for the numerical parameter Ns is determined independently of a second value for the numerical parameter Ns, wherein the second value for the numerical parameter Ns is usable for computing a paging occasion for a non-link budget limited UE in a cell based on system information broadcast by the base station; and
   in a discontinuous reception mode of operation:
   wake from sleep at a particular subframe of a particular downlink frame transmitted by the base station, wherein the particular downlink frame and particular subframe within a frame are identified respectively by the paging frame and the paging occasion;

determine if the particular subframe of the particular downlink frame transmitted by the base station includes a control channel comprising paging control information; and in response to determining that the particular subframe includes the control channel comprising paging control information:

determine the location of the paging payload data in a paging data channel based on the paging control information;

receive repetitions of paging payload data in a plurality of transmission time intervals; and in response to a determination that the paging payload data contains information identifying the UE device, perform a random access procedure to connect to the network through the base station.

2. The UE of claim 1, wherein the processor further configured to:
receive a system information block type 2 (SIB2) from the base station, wherein the SIB2 includes at least a DRX cycle for link budget limited UEs.

3. The UE of claim 2, wherein an idle mode DRX cycle for link budget limited UEs is longer than a DRX cycle for non-link budget UEs.

4. The UE of claim 1, wherein link budget limited UEs of the cell are grouped into a single paging occasion.

5. The UE of claim 1, wherein to determine that the UE is a link budget limited UE, the processor is further configured to determine that the UE is in an area of poor coverage.

6. The UE of claim 1, wherein the control channel is configured with an aggregation level of greater than eight (8), wherein the aggregation level is a number of control channel elements used to send the control channel.

7. The UE of claim 1, wherein a connected mode DRX configured for the link budget limited UE is longer than a connected mode DRX cycle for non-link budget UEs.

8. A base station, comprising:
at least one radio, wherein the at least one radio is configured to perform orthogonal frequency-division multiplexing (OFDM) cellular communication using at least one radio access technology (RAT); and
a processor coupled to the at least one radio, and configured to:
receive information that a user equipment device (UE) is link budget limited;
receive information intended for the UE;
determine a UE identifier, wherein the UE identifier is based on a subscriber identity of the UE;
determine a paging frame based on the UE identifier;
determine a paging occasion using a first numerical parameter for UEs that are link budget limited in a cell, wherein the first numerical parameter defines a number of available paging occasion identifier values;
broadcast paging parameters within system information in the cell, wherein a second numerical parameter usable for computing a second paging occasion for a non-link budget limited UE in the cell is based on the paging parameters within system information, wherein the first numerical parameter is determined differently than the second numerical parameter;
transmit paging control information to the UE in a paging control channel at a particular subframe of a particular downlink frame, wherein the particular downlink frame and the particular subframe are identified respectively by the paging frame and the paging occasion;
transmit repetitions of paging payload information in a plurality of transmission time intervals, wherein the paging control information specifies the location of paging payload information in a paging data channel; and
perform a random access procedure to connect the UE to a network.

9. The base station of claim 8, wherein the processor is further configured to:
transmit a system information block type 2 (SIB2), wherein the SIB2 includes at least a DRX cycle for link budget limited UEs.

10. The base station of claim 9, wherein an idle mode DRX cycle for link budget limited UEs is longer than a DRX cycle for non-link budget limited UEs.

11. The base station of claim 9, wherein the link budget limited UEs are grouped into a single paging occasion.

12. The base station of claim 8, wherein to determine that the UE is a link budget limited UE, the processor is further configured to determine the UE is in an area of poor coverage.

13. The base station of claim 8, wherein the control channel is configured with an aggregation level of greater than eight (8), wherein the aggregation level is a number of control channel elements used to send the control channel.

14. The base station of claim 8, wherein a connected mode DRX configured for the link budget limited UE is longer than a connected mode DRX cycle for non-link budget limited UEs.

15. An apparatus comprising:
a processor configured to cause a user equipment device (UE) to:
determine that the UE is link budget limited based on signal strength;
in response to determining that the UE is link budget limited:
inform a network via a base station that the UE is link budget limited;
determine a UE identifier based on a subscriber identity of the UE;
determine a paging frame based on the UE identifier; and
determine a paging occasion using a first value for a numerical parameter Ns used by UEs that are link budget limited, wherein Ns defines a number of available paging occasion identifier values;
wherein the first value for the numerical parameter Ns is determined differently than a second value for the numerical parameter Ns, wherein the second value for the numerical parameter Ns is usable for computing a paging occasion for a non-link budget limited UE in a cell based on system information broadcast by the base station; and
in a discontinuous reception mode of operation:
wake from sleep for a particular subframe of a particular downlink frame transmitted by the base station, wherein the particular downlink frame and particular subframe within a frame are identified respectively by the paging frame and the paging occasion; and
determine if the particular subframe of the particular downlink frame transmitted by the base station includes a control channel comprising paging control information; and in response to determining that the particular subframe includes the control channel comprising paging control information:
determine the location of the paging payload data in a paging data channel based on the paging control information;
receive repetitions of paging payload data in a plurality of transmission time intervals; and
in response to a determination that the paging payload data contains information identifying the UE device, perform a random access procedure to connect to the network through the base station.

16. The apparatus of claim 15, wherein the processor is further configured to:
receive a system information block type 2 (SIB2) from the base station, wherein the SIB2 includes at least a DRX cycle for link budget limited UEs.

17. The apparatus of claim 16, wherein an idle mode DRX cycle for link budget limited UEs is longer than a DRX cycle for non-link budget UEs.

18. The apparatus of claim 16, wherein the link budget limited UEs are grouped into a single paging occasion.

19. The apparatus of claim 15, wherein to determine that the UE is a link budget limited UE, the processor is further configured to determine that the UE is in an area of poor coverage.

20. The apparatus of claim 15, wherein the control channel is configured with an aggregation level of greater than eight (8), wherein the aggregation level is a number of control channel elements used to send the control channel.

* * * * *